United States Patent [19]
Caird et al.

[11] Patent Number: 5,237,511
[45] Date of Patent: Aug. 17, 1993

[54] DISTRIBUTION AUTOMATION SMART REMOTE TERMINAL UNIT

[75] Inventors: Kenneth J. Caird; Eric W. Godberson; David J. Westergaard, all of Calgary, Canada

[73] Assignee: Westronic, Inc., Calgary, Canada

[21] Appl. No.: 605,370

[22] Filed: Oct. 29, 1990

[51] Int. Cl.⁵ ............................................. G06F 15/20
[52] U.S. Cl. ..................................... 364/483; 364/492
[58] Field of Search .................... 364/483, 484, 492; 361/79, 86, 87; 371/29.1

[56] References Cited

U.S. PATENT DOCUMENTS

| | | | |
|---|---|---|---|
| 4,432,031 | 2/1984 | Premerlani | 364/492 |
| 4,454,509 | 6/1984 | Buennagel et al. | 364/492 |
| 4,516,214 | 5/1985 | Ray | 364/492 |
| 4,672,555 | 6/1987 | Hart et al. | 364/483 |
| 4,689,752 | 8/1987 | Fernandes et al. | 364/492 |
| 4,783,748 | 11/1988 | Swartztrauber et al. | 364/483 |
| 4,803,592 | 2/1989 | Ashley | 371/29.1 |
| 4,860,149 | 8/1989 | Johnston | 361/79 |
| 4,891,743 | 1/1990 | May et al. | 364/483 |

OTHER PUBLICATIONS

WESPAC Substation Protection and Control Systems (Oct. 14, 1992).
Wavelength—vol. IV, No. 2 (Oct. 14, 1992).
ASW C186—Real-Time Solutions—Remote Terminal Unit (Oct. 14, 1992,
Fred Maeder; "Shared Use of Remote Terminal Units for Energy Management Systems and Supervisory Control and Data Acquisition Systems"; Mar. 17, 1989; *Pacific Coast Elecrical Association Conference;* pp. 1-12.
IEEE Working Group on Distribution Automation; "Distribution Automation"; 1988; pp. ii-64.
"21st Century and Now Comes the Smart Substation"; Jun. 1989; *Electrical Systems Design;* pp. 42-43.
Mladen Kezunovic and B. Don Russell; "Microprocessor Applications to Substation Control and Protection"; Oct. 1988; *IEEE Computer Applications in Power;* pp. 16-20.
Willowglen 5211 Remote Terminal Unit (Oct. 29, 1990).
Landis & Gyr Systems Inc.; Telegyr 0500 (Oct. 29, 1990).
Ferranti International Controls Corporation; CHAPARRAL (Oct. 29, 1990).
Fisher Pierce; Series 13000 VIP Sensor (Oct. 29, 1990).
Advanced Control Systems; MPR-7075 Remote Terminal Unit (Oct. 29, 1990).
Thomas Yeh and Terry R. Klusmeyer, P. E.; "Fault Indicators to Improve System Reliability"; Mar. 22, 1990; Presented to the Pacific Coast Electric Association; pp. 1-54.
Carlos H. Castro, Hennings B. Bunch and Terry M. Topka; "Generalized Algorithms for Distribution Feeder Deployment and Sectionalizing"; 1979; Presentation at the IEEE PES Summer Meeting; pp. 1-2, 4, 6, 8.

*Primary Examiner*—Jack B. Harvey
*Assistant Examiner*—Ellis B. Ramirez
*Attorney, Agent, or Firm*—Dorr, Carson, Sloan & Peterson

[57] ABSTRACT

An improved distribution automation remote terminal unit which directly connects to a distribution feeder. The distribution automation remote terminal unit of the present invention is directly connected to voltage and current sensors on the feeder to sense the presence of signals on the distribution feeder. The remote terminal unit includes the first transformer interconnected to the potential sensors to produce a potential signal of reduced peak-to-peak voltage corresponding in phase to the AC potential waveform on the distribution feeder. A second transformer is directly coupled to the current sensor for producing a current signal of reduced peak-to-peak voltage corresponding in phase to only the AC current waveform on the distribution feeder. The reduced peak-to-peak voltage signals are delivered into a multiplexer and are sampled a predetermined number of times. The sampled analog voltage is then digitized by a digital to analog converter and delivered into a digital signal processor. Waveform parameters are determined. A microcontroller then accesses the waveform parameters to determine information such as the operation of upstream and downstream devices on the distribution feeder. This information is selectively transmitted to a remote master station over a communications link.

29 Claims, 20 Drawing Sheets

*Fig. 17A*
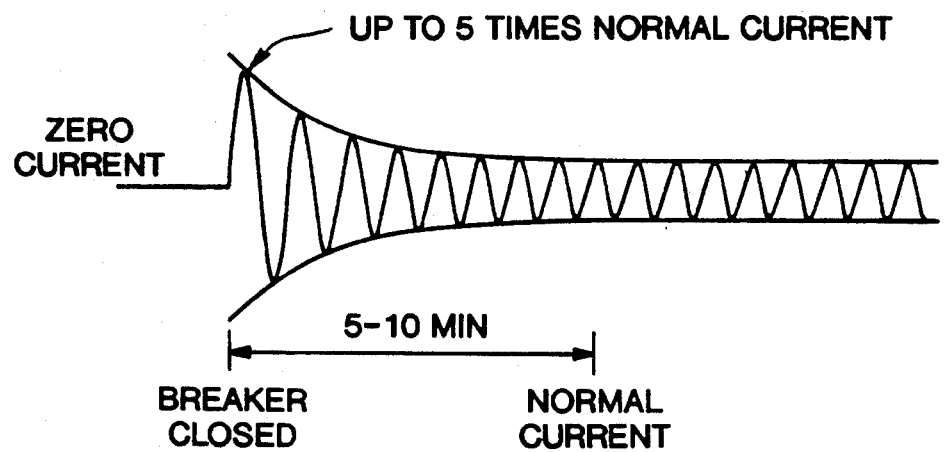
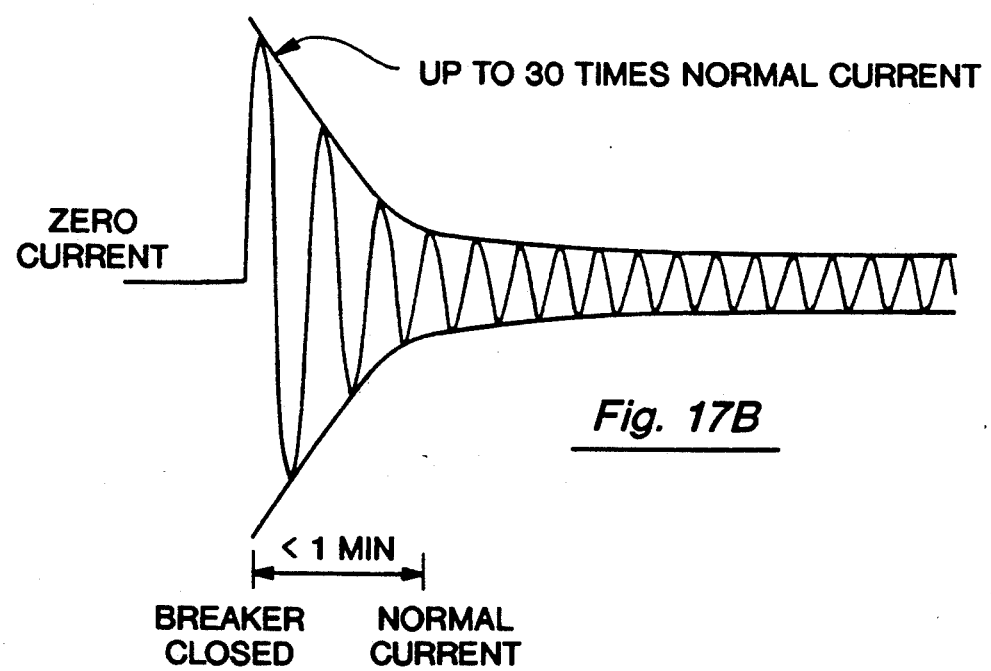
*Fig. 17B*
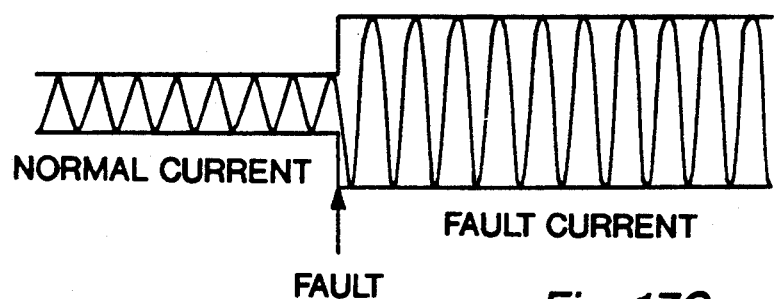
*Fig. 17C*

DISTRIBUTION AUTOMATION SMART REMOTE TERMINAL UNIT

BACKGROUND OF THE ART

1. Field of the Invention

The present invention relates generally to the field of electric power distribution and, more particularly, to a method and apparatus for providing smart or intelligent remote terminal units in a distribution automation system.

2. Statement of the Problem

In the electrical power industry, power is first generated and then distributed to a number of customers. In the generation portion of the electrical utilities business, significant electronic control over the generation has been required. For example, power can be conventionally generated from a hydroelectric plant and then delivered over transmission lines to a high voltage substation. Expensive and physically large electronic controls have been installed at such plants and substations to monitor the generation of power, the occurrence of faults, etc. In the electrical power industry, remote terminal units (RTUs) have been utilized to interconnect with the transmission lines to provide information back to a central location. Such RTUs are essential for the integrity of the generation of electrical power. An interruption in the generation of power substantially affects the entire power electrical network and disrupts downstream distribution of power to the customers. RTUs properly installed in the generation portion of a network are critical and mandatory. The cost of installing an average RTU is approximately $75,000.00. See "Shared Use of Remote Terminal Units for Energy Management Systems and Supervisory Control and Data Acquisition Systems", Maeder, *Pacific Coast Electrical Association Conference*, Mar. 17, 1989. Such complex RTUs are associated with other disadvantages: the systems are typically not standardized, poorly documented and difficult to maintain and operate. Such RTUs are also not well suited for harsh environments.

The distribution portion of a power network, however, has not utilized any degree of sophisticated electronic control and monitoring. The distribution portion of a utilities network would include distribution feeders, distribution substations, underground transformers, pad mounted transformers, etc., with feeder monitors, pole top capacitor banks, and the like for distribution of electrical power to commercial customers, multiple dwelling customers, industrial customers, and for the various governmental and residential customers. The electric power utility industry has traditionally used manual methods for gathering information concerning the quality of the electricity being distributed and concerning the actual distribution of energy. For example, chart recorders have been used at remote locations to record feeder amps and power flow. Also, tone equipment has been connected to simple mechanical multiplexers and telephone lease lines so as to transmit basic information to a centrally located operations center.

An advance with respect to information gathering pertaining to the distribution of electrical energy has been realized with a Distribution Automation System (DAS). In Distribution Automation (DA) a plurality of RTUs are located in the distribution network such as, for example, on pole tops and in distribution substations which are designed to perform a number of tasks. The topic of Distribution Automation is fully discussed in the IEEE tutorial course entitled "Distribution Automation" (1988) by the IEEE Working Group on Distribution Automation. With the availability of microprocessors, lower cost and "smart" RTUs designed for Distribution Automation have become available. See, for example, "Twenty L First Century and Now Comes the Smart Substation", *Electrical Systems Design*, June, 1989 (pp 42–43).

While the use of microprocessors in data acquisition both for the transmission and distribution portions of the electric power network has been discussed, the integration of electro-mechanical and static devices under control of an overall microprocessor has been difficult and true integration in data acquisition has not yet been recognized as having occurred. See "Microprocessor Applications to Substation Control and Protection" by Kezunovic and Russell, *IEEE Computer Applications in Power*, October, 1988 (pp 16–20). Hence, a need exists in the DA environment to integrate into one smart DA/RTU as many functions and features as possible.

In FIG. 1 a prior art Supervisor Control And Data Acquisition (SCADA) RTU is shown. As discussed above, the RTU in FIG. 1 has been utilized in the transmission portion of the electric power network and has typically occupied one or two floor cabinets and has typically been installed in high voltage substations or generator plants. The RTU in FIG. 1 includes the RTU control 10 powered by power supply 20 and interconnected to a distribution feeder line 30 through transducers 40. The transducers 40, as shown in FIG. 1, may include a 3 phase voltage transducer, a 3 phase current transducer, a KW-KVAR transducer, a neutral current transducer and a power factor transducer. The transducers 40 in turn are connected to a potential transformer PT 50 and to a current transformer CT 60. One PT 50 and one CT 60 are needed for each of the phases of the distribution feeder 30. 50 is a conventional sensor for sensing voltage and CT 60 is a conventional sensor for sensing current. Line post sensors could also be used to sense current and voltage in place of PTs 50 and CTs 60. The RTU control is interconnected with a modem 70 and a radio 80 in the FIG. 1 environment although any conventional means of communication with the RTU 10 can be utilized. Finally, the RTU control 10 responds to status inputs over lines 12. In FIG. 1, a conventional Overcurrent Fault Detector 90 and Backfeed Detector 92 having a current sensor CVS 94 interconnected with the distribution feeder 30 is shown. Detector 90 senses an overcurrent condition and detector 92 senses backfeed on a reversal in the direction of current on feeder 30. If the current in feeder 30 is in the proper direction, the output of invertor 98 is high and the AND gate 96 will extend any overcurrent detection as a status input 12 to the RTU 10. If the current in feeder 30 is in the reverse direction, the low output of invertor 98 prevents an overcurrent detection from being delivered to the RTU. This feature will be more fully discussed with respect to FIG. 10, supra. The RTU 10 issues control outputs over lines 14 for controlling items such as switches 100 and the like.

A need exists for a DA/RTU that finds application not only in substations, but on pole tops and other locations in the distribution portion of the electric power network. A need exists for a DA/RTU that is small in size, that is inexpensive to manufacture, install and maintain, that is reliable in operation and performance despite severe environmental conditions, that will provide a stable output, i.e., one that will not drift over time, and that maximizes the amount and quality of data acquisition through microprocessor control. A need exists for a Da/RTU that preprocesses as much data as possible so as to send only condensed information over the communication link 80.

CONVENTIONAL DA/RTUS

The traditional SCADA RTU of FIG. 1 has been scaled down by a number of vendors to be utilized for data acquisition and control in Distribution Automation. For example, WillowGlen Systems Limited number 1, 1235-64 Ave., S.E, Calgary, Alberta, Canada manufactures a model #5211 RTU. Landis and Gyr Systems Inc., 1730 Technology Drive, San Jose, Calif. 95110 manufactures the TELEGYR 0500 smart RTU which contains a built-in modem and radio interface. Ferranti International Controls Corporation, Sugarland, Tex. 77487 manufactures the CHAPARRAL smart RTU which provides automatic gain and offset compensation in its RTU firmware with every analog scan. Advanced Control Systems, P.O. Box 47824, Atlanta, Ga. 30362, manufactures a smart RTU as model MPR-7075. All of these systems however are transducer based and must interconnect to the distribution feeder 30 through transducers 40 for operation. An example of the transducers 40 shown in FIG. 1 is manufactured by The Fisher Pierce division of Sigma Instruments, 90 Libbey Pkwy, Weym Mass. 02189 as the series 1600 VIP transducer. A discussion of the nature and types of commercially available detectors 90 and 92 of FIG. 1 is found in "Fault Indicators to Improve System Reliability", Yeh and Klusmeyer, Presented at Pacific Coast Electric Association, Mar. 22, 1990.

SOLUTION TO THE PROBLEM

The present invention addresses the above needs by providing a small DA/RTU that is capable of being mounted on a pole top or at other remote locations, that is environmentally rugged to withstand operation in such locations, that is low in cost, that requires no maintenance, that is relatively insensitive to damage caused by lightning strikes or power surges, that will reliably operate, that automatically calibrates itself to compensate for component drift over time, that self-checks the signal sensing portion of its circuitry, that is manufactured from a reduced number of individual components, and yet fully interfaces and retrofits with present PTs, CTs and switches in the power distribution network. Furthermore, the DA/RTU of the present invention is transducerless thereby eliminating the transducers 40 of the prior RTU approach of FIG. 1. This significantly saves on the cost of the overall RTU and it significantly simplifies the installation of the RTU, the present invention. The elimination of the transducers 40 eliminates the requirement for pre-engineering the RTU to a given site. This saves at least 50% in the average cost of installation of an RTU. It also minimizes installation error which is typified by installing the transducers with the wrong polarity. More importantly, the DA/RTU of the present invention is directly coupled to the distribution feeder 30 and directly samples the true signal as received by the PTs and the CTs, 50 and 60, respectively. The elimination of transducers 40 of FIG. 1 is significant in that the transducers 40 act as a filter and cause smoothing to the signal appearing on the distribution feeder 30. Furthermore, the DA/RTU of the present invention fully integrates overcurrent and backfeed detection and eliminates the use of separate current sensors 94 required in the prior art approach of FIG. 1. All signals required under the teachings of the present invention are derived from the direct connection to the existing PTs and CTs. Finally, the present invention performs significant timing and preprocessing of information so as to transmit only condensed information such as status, flags, and upstream and downstream device operation indications.

SUMMARY OF THE INVENTION

An improved distribution automation remote terminal unit is disclosed which interconnects with a plurality of potential transformers and current transformers (or line post sensors) that are interconnected to a distribution feeder. The distribution automation remote terminal unit of the present invention is directly connected to these voltage and current sensors to fully sense the presence of AC signals on the distribution feeder. The remote terminal unit of the present invention includes the first transformer interconnected to the potential sensors to produce a potential signal of reduced peak-to-peak voltage corresponding in phase to the AC potential waveform on the distribution feeder. A second transformer is directly coupled to the current sensor for producing a current signal of reduced peak-to-peak voltage corresponding in phase to only the AC current waveform on the distribution feeder.

The reduced peak-to-peak voltage signals are delivered into a multiplexer and are sampled a predetermined number of times. The sampled analog voltage is then digitized by a digital to analog converter and delivered into a digital signal processor. Waveform parameters are determined such as RMS, peak-to-peak, crest factor, etc., and are stored in a dual port RAM. These waveform parameters are calculated on a per cycle basis thereby obtaining high resolution. A microcontroller then accesses the stored waveform parameters in the dual port RAM to determine information such as the operation of upstream and downstream devices on the distribution feeder. This information is selectively transmitted to a remote master station over a communications link.

Figure 12:
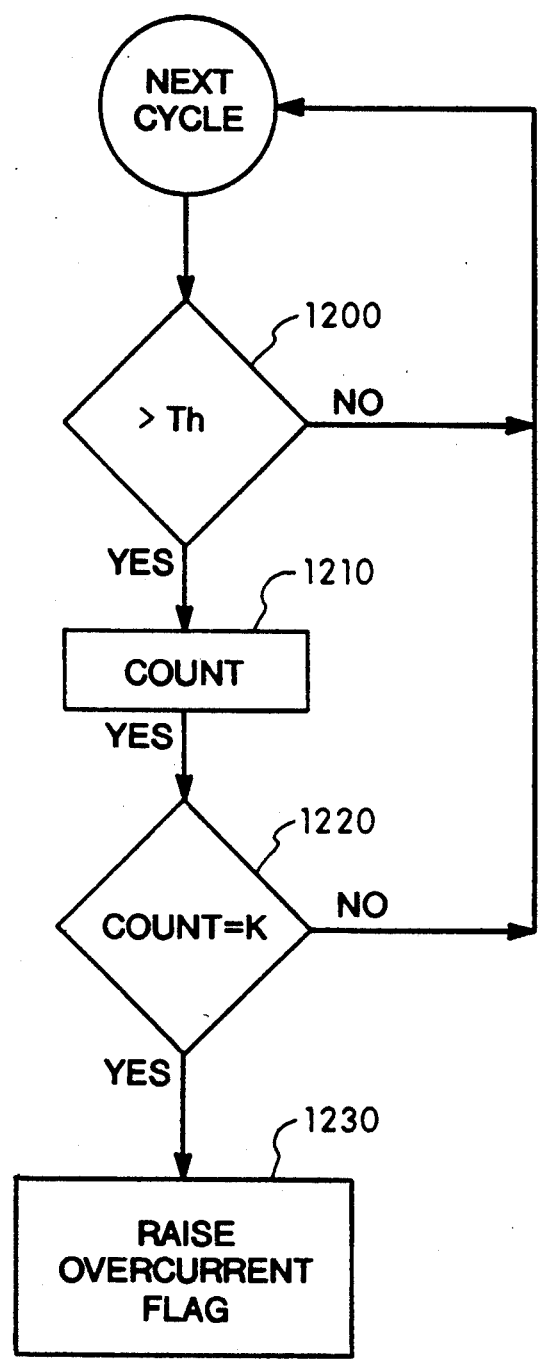
Figure 13:
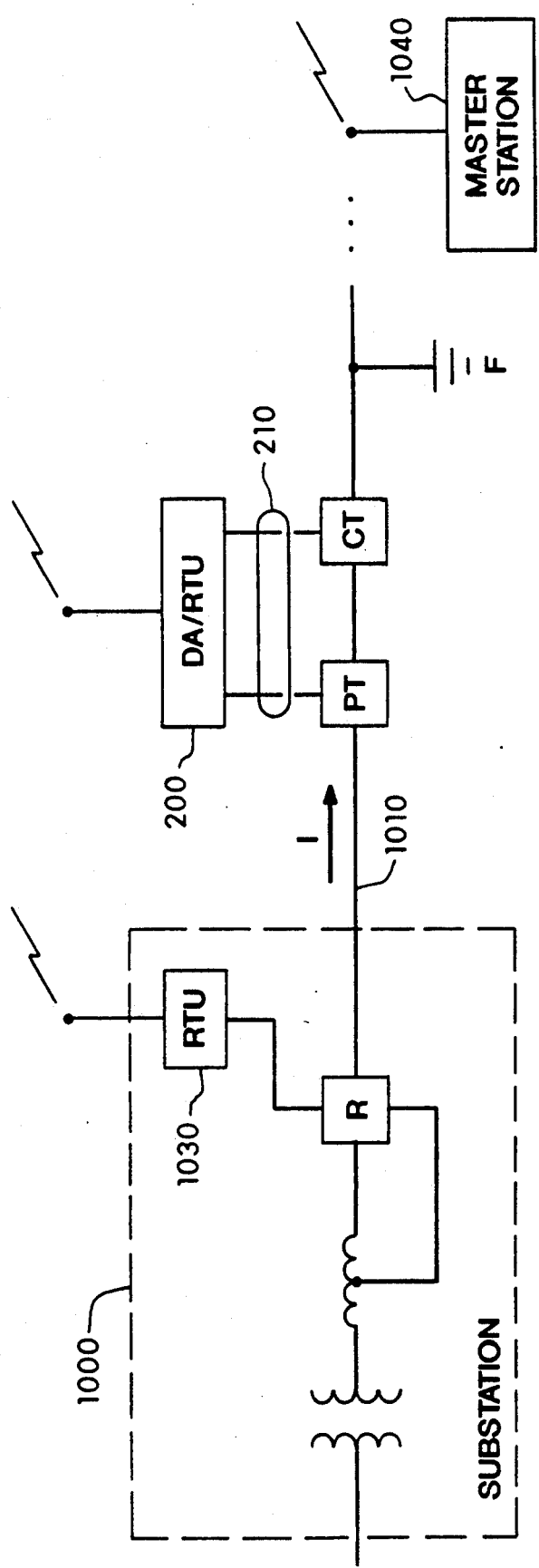
Figure 14:
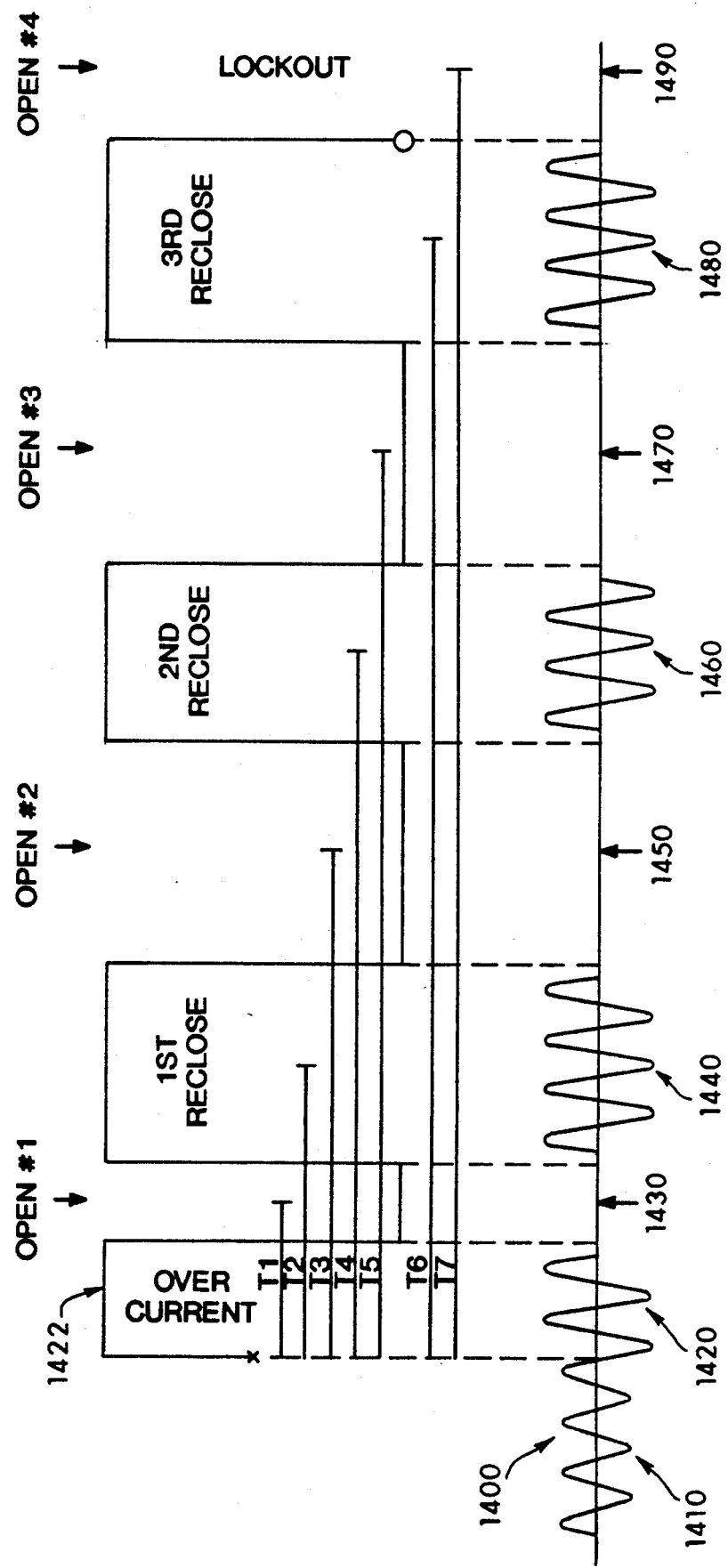
Figure 15:
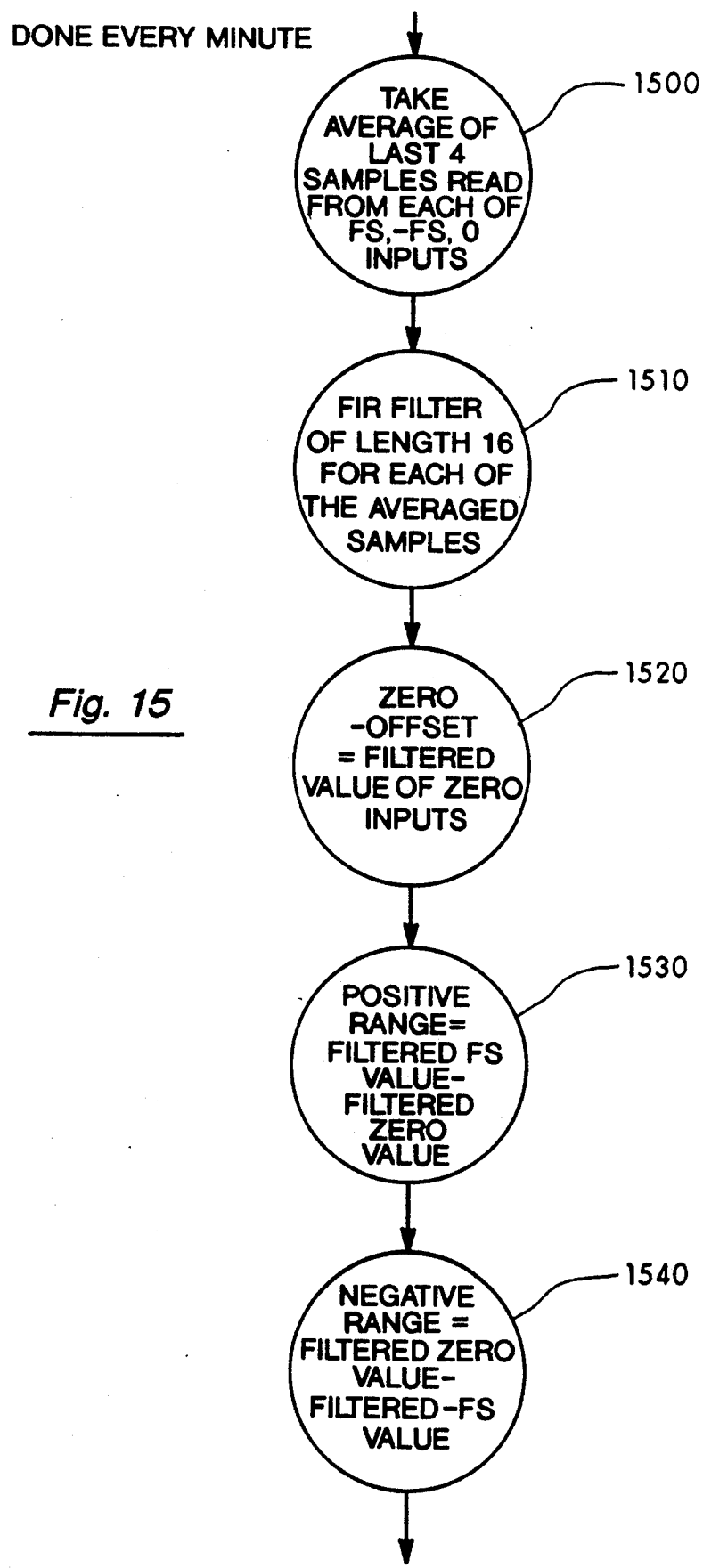
Figure 16:
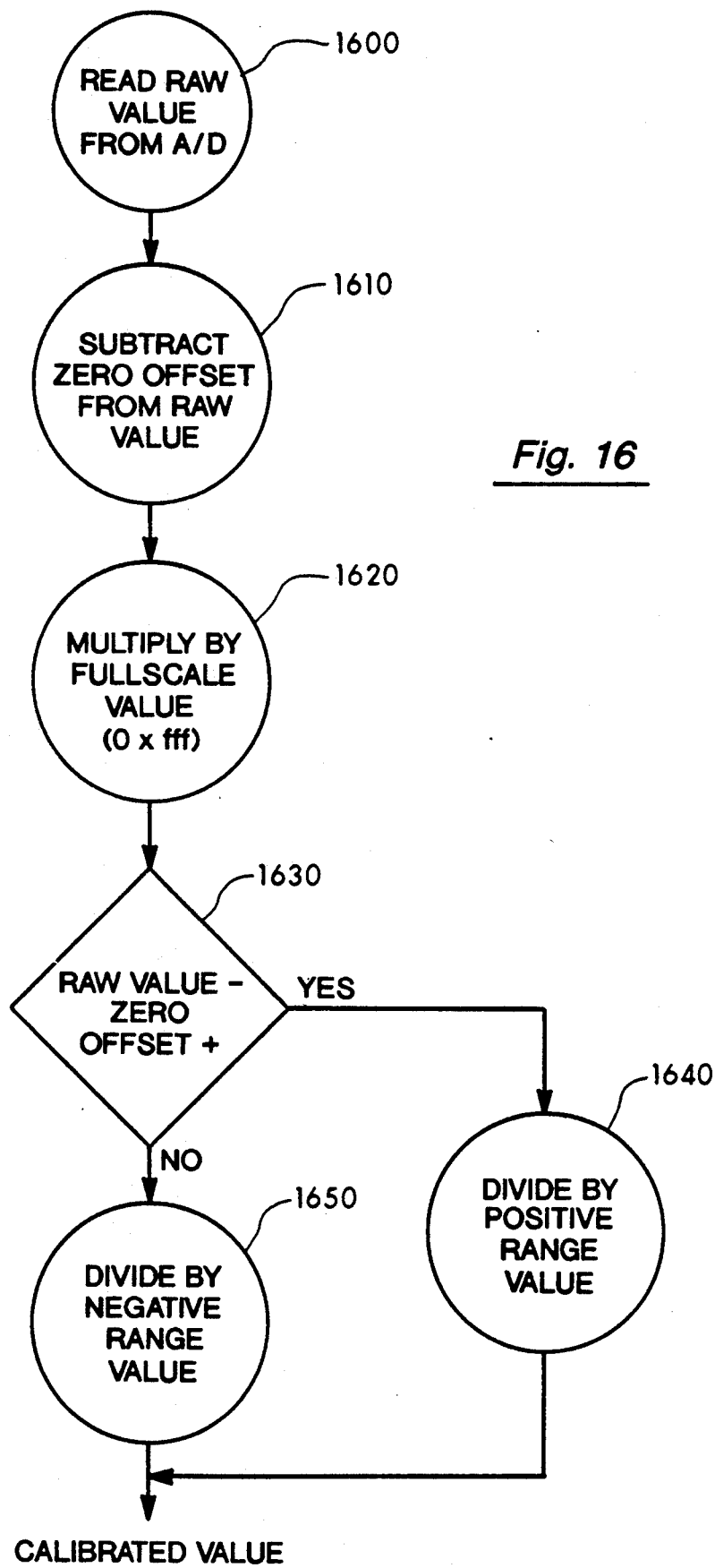
Figure 18:
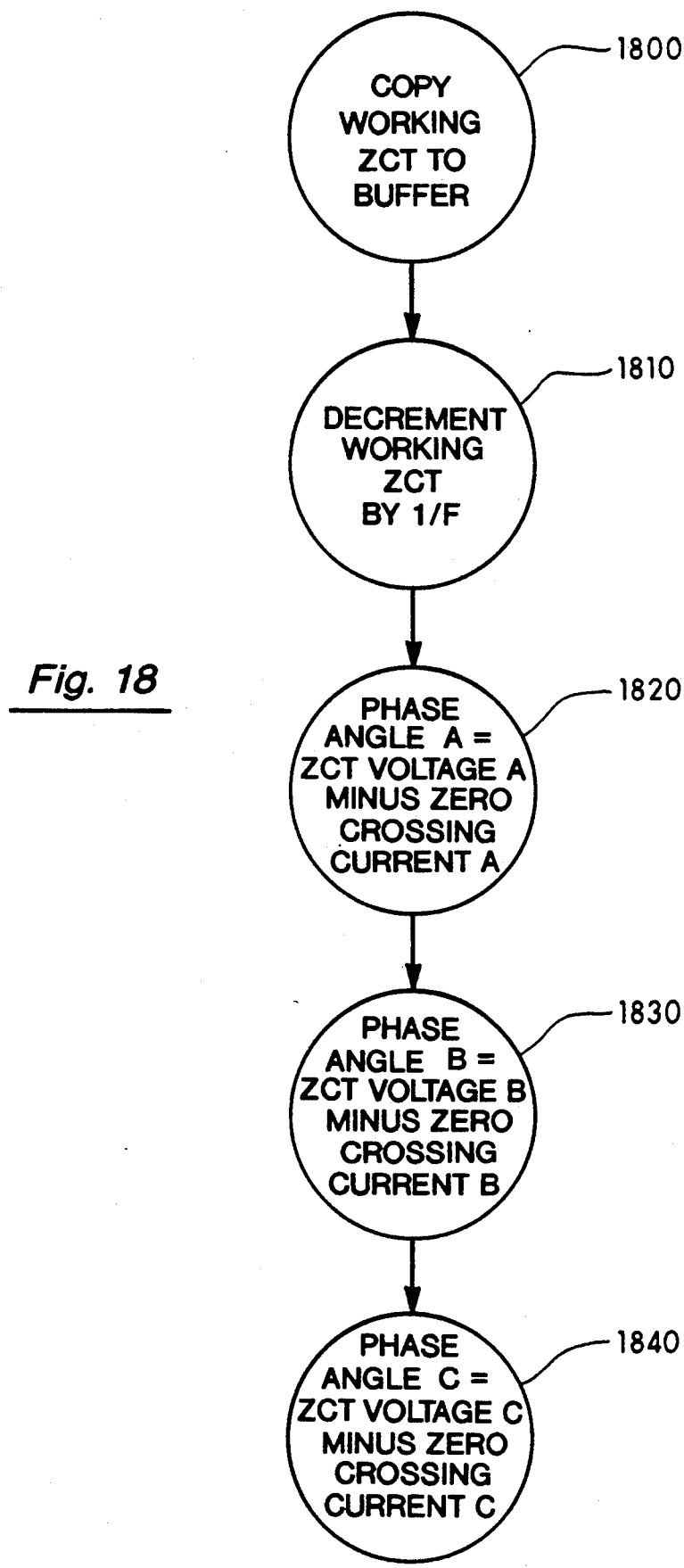

FIG,. 12 is a block diagram illustration of the dual port RAM of the present invention sharing peak data between the digital signal processor and the micro controller;

FIG. 12 is the flow chart for determining an overcurrent condition;

FIG. 13 illustrates the operation of the present invention in verifying operation of an upstream device;

FIG. 14 sets forth the prior art operational sequence of a conventional reclosure device;

FIGS. 15 and 16 are the autocalibration flowcharts;

FIGS. 17 A-C illustrates cold load pick-up, magnetization and fault current state conditions;

FIG. 18 is the phase angle flow chart; and

Figure 19:
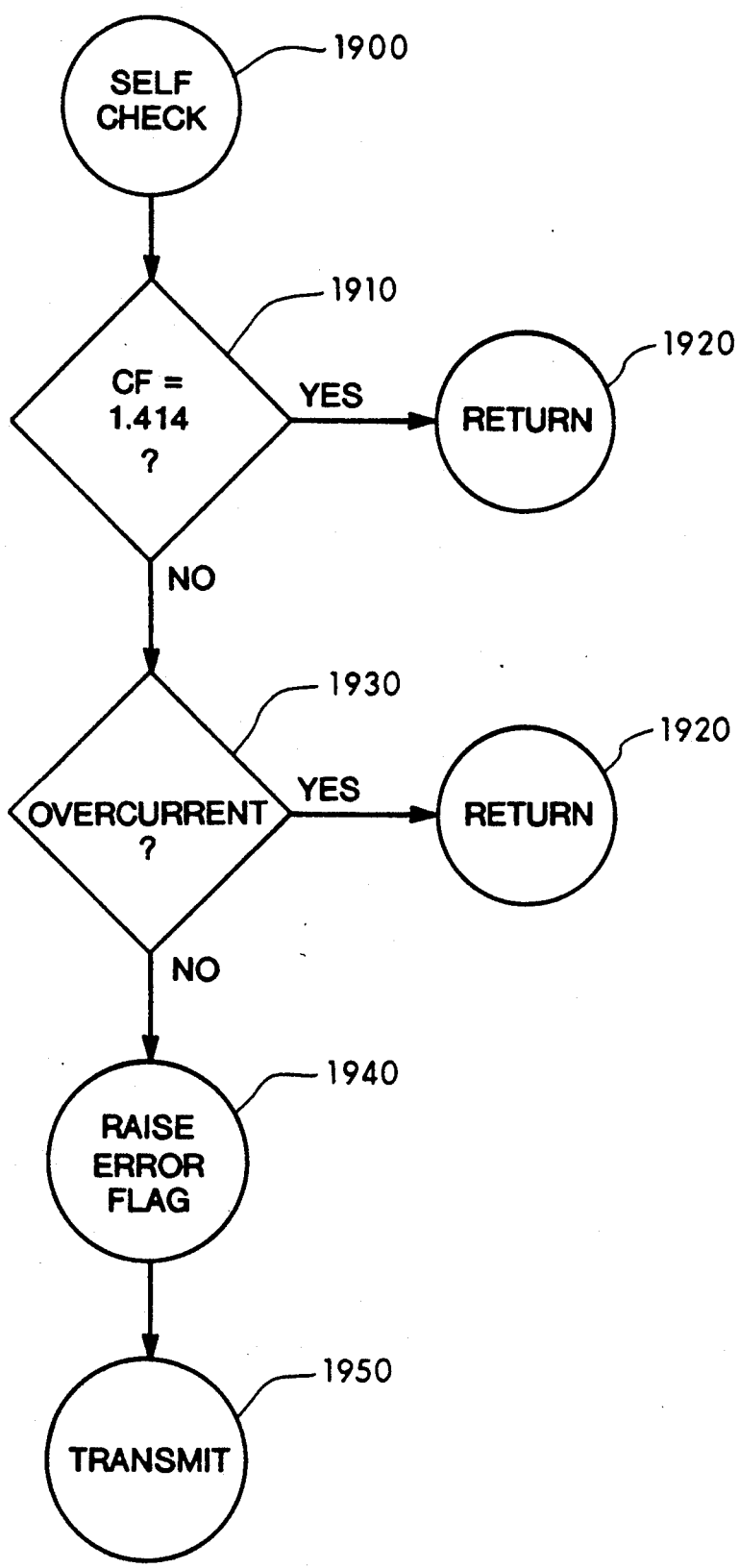

FIG. 19 is the self-checking flow chart.

DESCRIPTION OF PREFERRED EMBODIMENT

General Description

Figure 1:
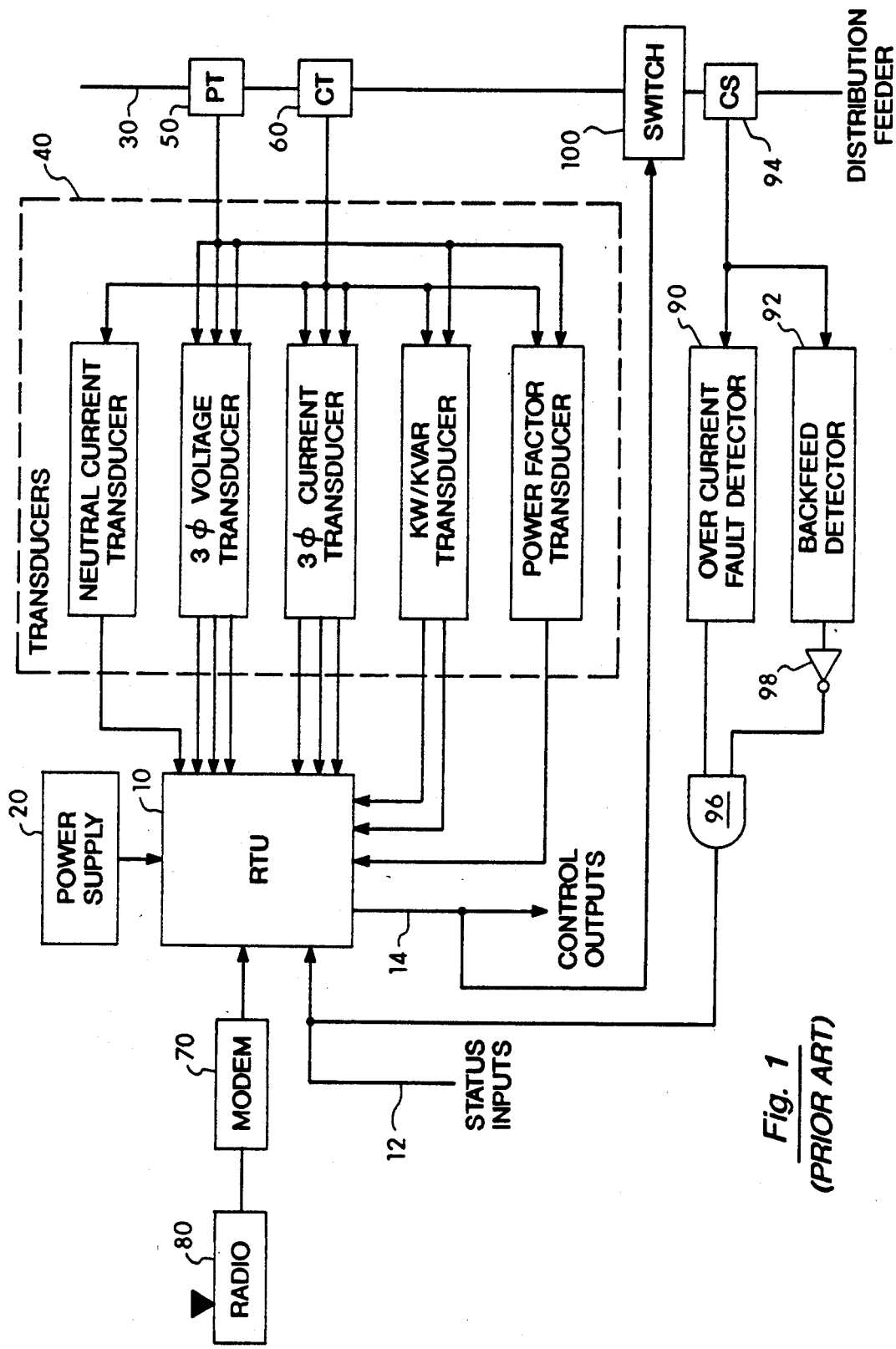
FIG. 1 is a block diagram representation of a prior art RTU.
Figure 2:
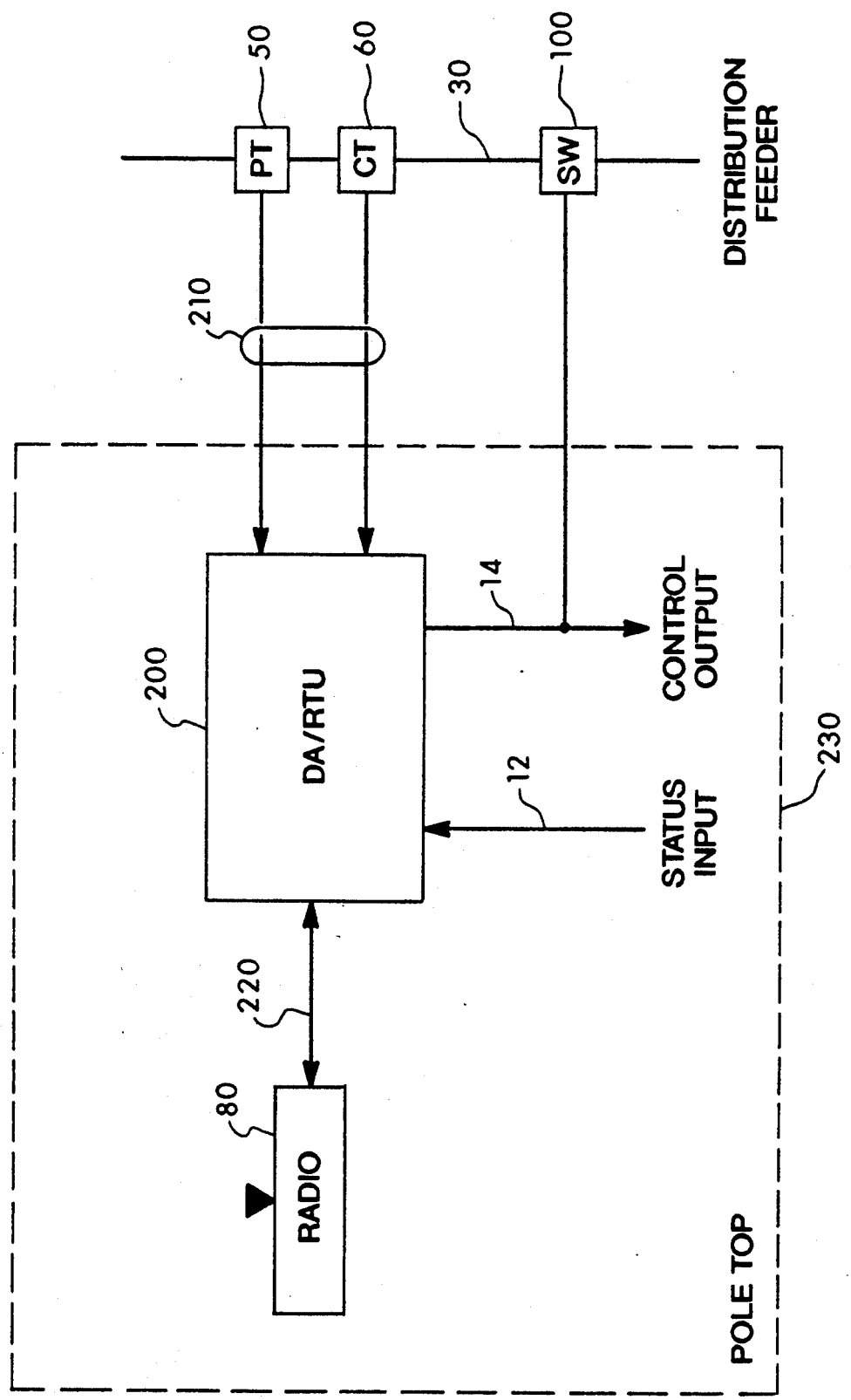
FIG. 2 is a block diagram representation of the DA/RTU of the present invention.

In FIG. 2, the DA/RTU 200 of the present invention is shown directly interconnected with a distribution feeder 30, conventional PTs 50 and CTs 60, and a radio 80 connected to the DA/RTU over communications link 220. As with the prior art approach of FIG. 1, the DA/RTU 200 of the present invention responds to status inputs 12 and issues control outputs 14. The DA/RTU 200 of the present invention could be packaged at a remote location such as, for example, at a pole top 230 where the sensors 50 and 60 as well as the switch 100 are located.

The DA/RTU 200 of the present invention is designed to fully retrofit and connect with conventional PTs 50 and CTs 60 (or line post sensors), to respond to conventional status inputs 12, to issue conventional control outputs 14, and to provide communications through a radio channel or other suitable communications such as a fiber optic connection according to the network protocol and communications plan of a particular utility grid. The DA/RTU 200 of the present invention is designed to eliminate the need for the transducers 40 and detectors 90 and 92 of the prior art approach of FIG. 1 and to be directly coupled to PTs 50 and CTs 60. This provides a significant upgrade in the quality of RTU analysis since any signal distortion, filtering or drift caused by the transducers 40 does not occur. Furthermore, under the teachings of the present invention, the elimination of the transducers 40 significantly speeds up the installation of the DA/RTU 200 of the present invention. The DA/RTU 200 of the present invention is fully integrated. This integration reduces the physical size by approximately 20% in comparison to competitive DA/RTUs and also reduces the cost by a corresponding 20%. However, because the transducers 40 are not required, they need not be installed. This eliminates any pre-engineering of the DA/RTU interconnections to a specific site and enables installation to be significantly simpler and more reliable. Under the teachings of the present invention, the DA/RTU 200 saves at least 50% in the cost of installation through reduced components, elimination of pre-engineering, and reduced wiring costs. Furthermore, error costs through improper installation are significantly minimized because of the direct coupling between the DA/RTU 200 and the PTs 50 and CTs 60 as indicated by lines 210. The elimination of the detectors 90 and 92 and their requirement for a separate sensor 94 also reduces wiring and allows the DA/RTU 200 to fully integrate overcurrent and backfeed based only upon the signals obtained from the conventional PTs and CTs.

It is to be understood that the direct connection 210, in the preferred embodiment, enables the DA/RTU 200 of the present invention to be coupled to at least twelve PTs 50 and CTs 60 arranged in any combination. While this is a preferred embodiment, it is to be expressly understood that any number in any combination of PTs 50 and CTs 60 ( or line post sensors) could be utilized under the teachings of the present invention. Furthermore, for the purpose of simplicity in discussing the ensuing invention, only one PT 50 and one CT 60 is shown in FIG. 2 and, in the ensuing, it is to be made clear that reference to PTs and CTs also includes the category of line post sensors or any suitable current or potential sensors. The present invention is not to be limited to the type of current or potential sensor provided it senses the AC signals on the feeder. However, when it is appreciated that twelve PTs and CTs are to be interconnected, the significant savings in installation wiring costs in comparison to the approach FIG. 1 where the four transducers must be wire is readily apparent.

Finally, the DA/RTU 200 of the present invention is designed to have autocalibration and, therefore, it is designed to be maintenance free except in the event of component failure. That is, the DA/RTU 200 is maintenance free in comparison to the prior art SCADA RTU of FIG. 1 in which drift in the transducers, detectors and the RTU control 10 components can occur and which requires periodic maintenance. Even though drift may occur in the components of the present invention, the DA/RTU 200 will automatically and fully compensate for it. This is an important distinction between the prior art of FIG. 1 and the teachings of the present invention shown in FIG. 2 since with the elimination of transducers 40, a significant error caused by drift, which could not be compensated even with autocalibration, is entirely eliminated. This significantly increases the reliability and the quality of data acquisition. Hence, with the elimination of the transducers 40, the direct connection 210 of the present invention provides the delivery of a true signal from the PTs 50 and CTs 60 into the DA/RTU 200 for digital analysis incorporating backfeed and overcurrent detection. The distortion caused by the transducers 40 and detectors 90 and 92 and their resultant drift over time is simply eliminated under the teachings of the present invention.

As will be pointed out in the following, the DA/RTU 200 of the present invention fully integrates many new additional features not present in conventional art SCADA RTUs. The DA/RTU 200 of the present invention is capable of performing at its on-board location: overcurrent detection, backfeed detection, logically preventing false fault indication due to magnetization and cold load pick up, full fault conditions, and breaker operation and lockouts, all at significant response speeds of approximately, in the preferred embodiment, one millisecond resolution.

These types of analyses (at times requiring one or two cycle analysis of the sensed waveform) can only be performed with the inputting of a true signal into the DA/RTU 200 of the present invention and could not be performed with the signals delivered by the transducers 40 of the prior art approach of FIG. 1 into the RTU control 10. In addition, while commercially available separate systems are capable of performing RMS and peak signal detection, actual duration of faults, and Kwatts and Kvars and power factor calculations, (such as digital fault systems and electronic polyphase meters), the DA/RTU 200 of the present invention is capable of fully integrating these additional features into a signal unitary system with on-board preprocessing capabilities. Again, these additional features are not found in prior art SCADA RTUs 10 of FIG. 1.

Further, the DA/RTU of the present invention can be set, from a remote location (such as a master station), to have its overcurrent peak levels, overcurrent timer, loss of voltage or current timers, and its loss of voltage or current values selectively changed. Hence, these values are downloadable from the master station or a portable personal computer in the field. This is to be distinguished with prior DA/RTU, which were only settable in the factory.

The DA/RTU 200 of the present invention conforms to all ANSI/IEEE applicable standards and operates in the temperature range of −40 to +80 degrees C. in 100% humidity.

DETAILED SYSTEM DISCUSSION

Figure 3:
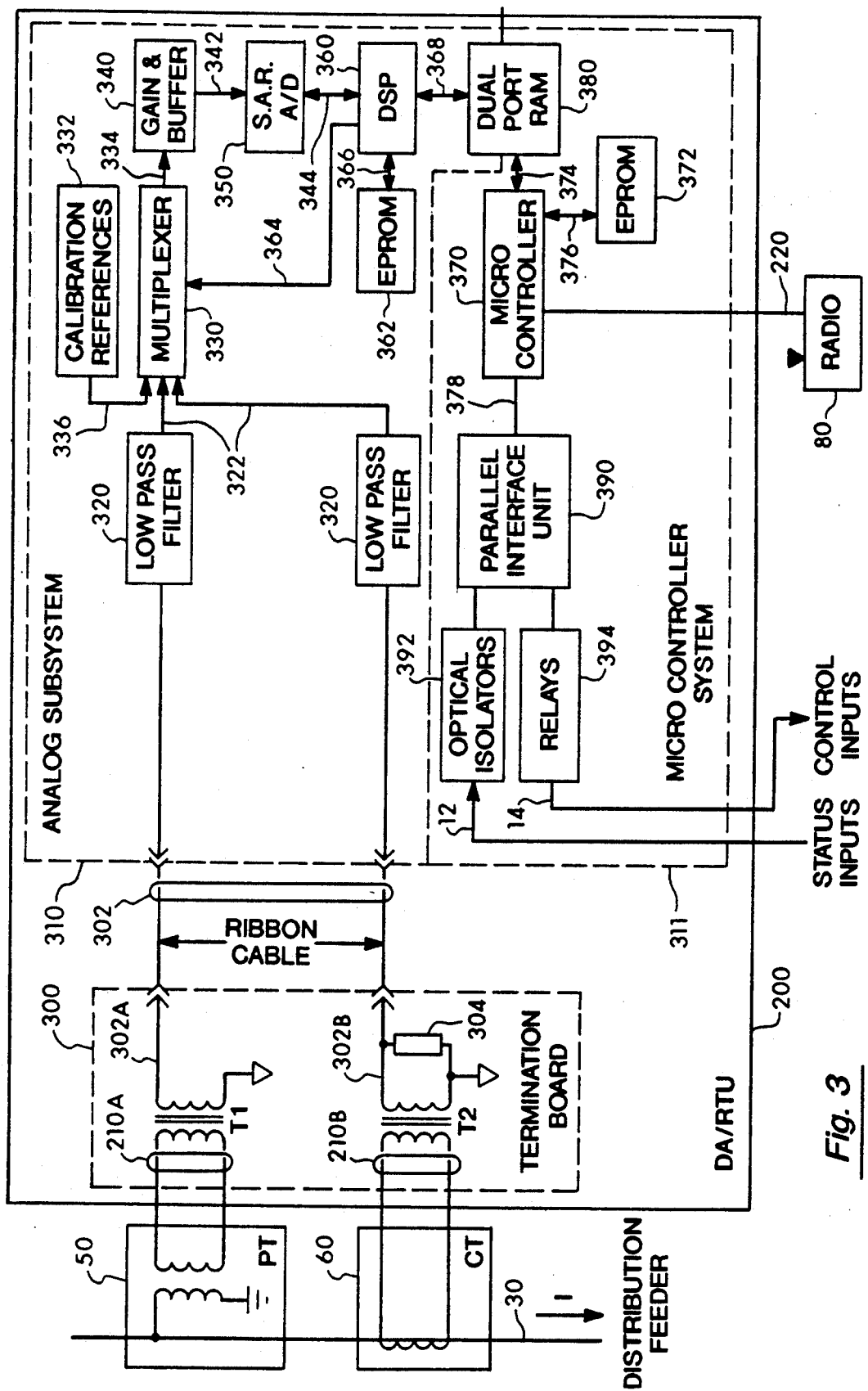
FIG. 3 is a detailed block diagram of the DA/RTU of the present invention illustrating the termination board and analog subsystem portion thereof.

In FIG. 3 the block diagram of the components of the DA/RTU 200 of the present invention are shown. The DA/RTU 200 includes a termination board 300, an analog subsystem 310, and microcontroller system 311. The termination board 300 is connected to the PTs 50 and CTs 60 over a direct connection 210. The termination board 300 in turn is connected over a ribbon cable 302 to the analog subsystem 310. It is to be expressly understood that the termination board 300, the analog subsystem 310, and the microcontroller system 311 could be located on the same board. The analog subsystem 310 generates the signal values such as the RMS value and stores such values in the dual port RAM 380. The microcontroller system 311 uses the signal values stored in the dual port RAM 380 to provide significant preprocessing receives status inputs, issues control outputs, and engages in two-way communication. The microcontroller 311 also communicates with the radio 80 over link 220. The operation of the DA/RTU 200 of the present invention is disclosed in the following.

a. PTs 50 and CTs 60/Termination Board 300

PT 50 is a conventionally available circuit which interconnects to the distribution feeder 30 through a transformer coupling. The PT 50 outputs an analog voltage signal over lines 210A. In a typical environment, the PT 50 is responsive to providing output voltages on lines 210 of 69, 120, 227, and 240 volts AC with an overload rating of a continuous 200% voltage. Lines 210 are delivered into the termination board 300 and access a step down coupling transformer T1 which provides an output on line 302A of a normalized 5 volt peak AC signal. Because of the 200% continuous voltage overload rating, in an overload situation, the signal on line 302A can vary from 0 to 10 volts peak-to-peak AC. It is to be expressly understood that, if there are six PT circuits 50, then there would be a corresponding number of coupling transformers T1; therefore, in that example there would be six separate 302A lines. It is to be expressly understood that any number of PTs 50 could be utilized with a corresponding number of coupling transformers T1 so that when combined with the CTs 60 a maximum of twelve inputs would exist on ribbon cable 302.

The CT circuit 60 utilizes a current transformer which delivers an output over lines 210B to the termination board 300 which is coupled to transformer T2. CTs 60 are conventionally available devices. The current inputs over lines 210B from the CT 60, in the preferred embodiment could be, for example, 1, 5, 10 or 20 amps. The overload rating for current is typically 400%. Hence, if the current in the distribution feeder 30 is 600 amps, the output of CT would be 5 amps on lines 210B. If the coupling transformer T2 and an associated precision resistor 304 generate a 5 volt peak AC signal representing 300% of total circuit current, then the output would be 0 to 10 volt s peak (corresponding to 0–20 amps). Across the secondary of transformer T2 is a precision resistor 304. It is to be expressly understood that while the ribbon cable 302 is capable of delivering twelve inputs to the analog subsystem 310, the present invention could be designed for any suitable number of inputs, and the present invention is not to be limited to the preferred embodiment of twelve. Likewise, it is to be expressly understood that although normalized AC peak voltages of 5 volts appear on lines 302A and 302B again any suitable voltage reference value could be utilized under the teachings of the present invention without departing from the spirit of innovation as set forth in the claims. It is also to be expressly understood that appropriate protection devices could be placed on lines 210 such as surge withstand capability and impulse protection devices. These conventional components are not shown so as to simplify the discussion of the present invention. The use of transformers T1 and T2 and the provision of normalized 5 volt peak AC signals on line 302 achieve the direct coupling of the DA/RTU 200 of the present invention to conventional PTs 50, CTs 60 and line post sensors and eliminate the requirement of the transducers 40 and detectors 90 and 92 as shown in FIG. 1.

b. Analog Subsystem 310

The Analog Subsystem 310 includes low pass filters 320, a multiplexer 330, a gain amplifier and buffer 340, an analog-to-digital converter 350, a Digital Signal Processor (DSP) 360, and a dual port RAM 380. A calibration reference 332 and an EPROM 362 are also provided.

Low pass filters 320 are interconnected to the ribbon cable 302 and are interconnected over lines 322 to the multiplexer 330. The multiplexer 330 delivers its output 334 to the gain and buffer amplifier 340. The multiplexer 330 is also connected over lines 336 to the calibration references 332. The output of the gain amplifier and buffer circuit 340 is delivered over lines 342 to the analog-to-digital converter 350 whose output is delivered over lines 344 to the DSP 360. The DSP 360 controls the multiplexer over lines 364 and is interconnected to the EPROM 362 over lines 366. The digital signal processor 360 is in two way communication with the dual port RAM 380 over lines 368.

Each low pass filter 320 functions to pass the 60 Hz frequency of the signals on lines 302 and to block the signals which are of higher frequency then can be converted by the analog-to-digital converter 350. A low pass filter 320 is provided for each of the twelve lines 302, in the preferred embodiment. The filtered signals are then delivered over lines 322 to the multiplexer 330 which also receives as inputs three reference signals from the calibration circuit 332. The signals on lines 322 and 336 serve as inputs to the multiplexer 330 which provides only one of these signals on output 334.

The digital signal processor 360 over lines 364 controls the sampling rate of the multiplexer 330. In the preferred embodiment, each input on lines 322 and 336 is sampled sixteen times per cycle. Since there are provided, in the preferred embodiment, up to 12 inputs or points on lines 322 and up to three inputs or points on lines 336 up to fifteen points are actually measured in each sample period. However, sixteen points are allocated so that in a complete AC cycle $16 \times 16 = 256$ points are measured. The individual analog sample is delivered by the multiplexer on line 334 into amplifier 340 which serves as an impedance matching buffer.

In the preferred embodiment, the multiplexer 330 may be a conventionally available component such as Model HI1-548-4 from Harris, 407 John Rodes Blvd., Melbourne, Fla., and the gain amplifier 340 is of the type LM 208 from National Semiconductor.

The three calibration reference signals on lines 336 are at 100% of the full swing of the 5 volts AC peak to peak signal and at 0 voltage. (i.e., $-5$ volts, 0 volts, $+5$ volts). These three reference values are scanned sixteen times per cycle and are used to calibrate the system every minute so that should any drift occur from the multiplexer 330 through the remainder of the analog subsystem 310, the system would fully compensate for it. As previously mentioned, since the transducers 40 of the prior art approach are eliminated, there is no drift in the circuitry from the distribution feeder 30 through the multiplexer 330.

The precision voltages in circuit 336 are provided by Analog Devices AD588AD. The delivered analog signal from each sample (i.e., sixteen samples per cycle per point $=256$ samples per cycle) from the gain and buffer circuit 340 is delivered over lines 342 to the analog-to-digital circuit 350. This is a conventional analog-to-digital circuit of the type that is conventionally available as a Successive Approximation Register (SAR) (e.g., ADC1241 from National Semiconductor) which provides a fast analog to digital conversion. The output of the A to D converter 350 is delivered over lines 344 as a digital value. This is delivered to the digital signal processor 360. In the preferred embodiment, the digital signal processor 360 is of the type which is available from Analog Devices as ADSP-2105.

The software for operating the digital signal processor 360 exists in the EPROM 362 which is delivered over lines 366 to the digital signal processor 360. The signal values which are calculated by the digital signal processor 360 are stored in the dual port RAM 380.

c. Microcontroller System 311

The microcontroller system 311 contains the microcontroller 370, the parallel interface unit 390, optical isolators 392 and relays 394. The microcontroller receives the signal values from the dual port RAM 380 through lines 374 and is further connected to EPROM 372 via lines 376.

The microcontroller 370 is a conventional microprocessor (e.g., Motorola 68HC11) which is under control of software stored in the EPROM 372. Microcontroller 370 delivers through a conventional parallel interface unit 390 control outputs on line 14 and receives the status inputs on line 12. Microcontroller 370 is connected to interface 390 over lines 378. As shown in FIG. 3, the parallel interface unit 390 extends the control output signals through a set of relays 394. The status inputs 12 are delivered through optical isolators 392 to the parallel interface unit 390. The interface 390, isolators 392, and relays 394 are conventional to the design of DA/RTUs.

In operation the analog subsystem 310 utilizes a digital signal processor 360 to process the raw analog signals that are delivered over lines 302 and delivers the processed signal values into the dual port RAM 380. The microcontroller 370 which has access to these processed signal values in the dual port RAM 380 communicates with the external world by receiving status inputs and delivering control outputs. The microcontroller 370 is further capable of providing significant preprocessing of the signal states appearing on the distribution feeder as will be explained later. The digital signal processor 360 and the microprocessor 370 operate independently of each other.

The circuitry of FIG. 3 is a preferred embodiment and it is to be expressly understood that a number of changes could be made under the teachings of the present invention.

Detailed DA/RTU 200 Operation

Figure 4:
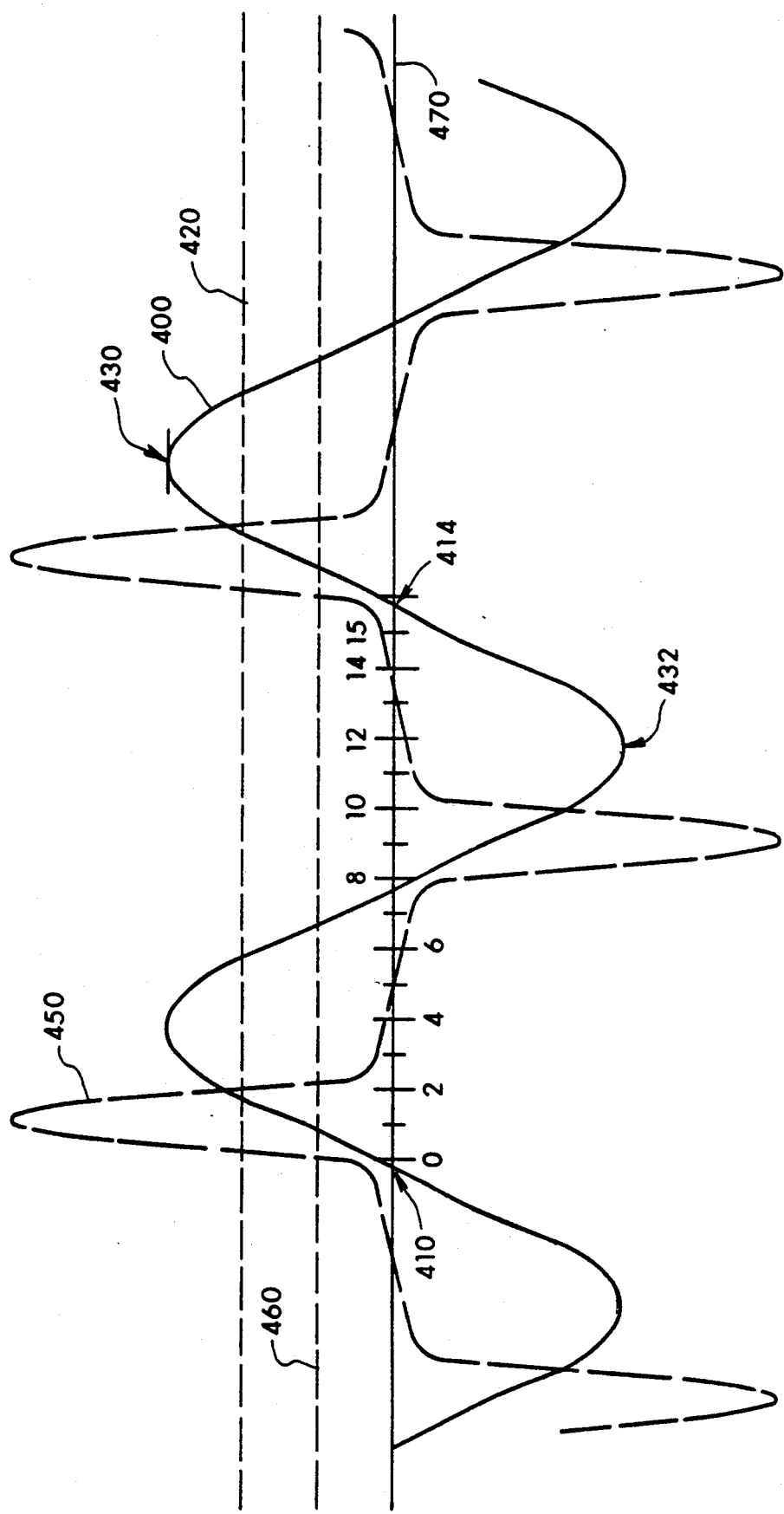
FIG. 4 is a graphical illustration setting forth the sixty Hertz signal appearing on a feeder line along with a representation of a saturated current transformer when overcurrent exists on the feeder line.

The operation of the DA/RTU 200 of the present invention as set forth in FIGS. 2 and 3 will now be discussed with reference to FIG. 4. In the example of FIG. 4, the CT 60 senses and delivers a true AC signal 400 to the coupling transformer T2. The coupling transformer T2 delivers a true representation of the AC signal 400 in the $\pm 5$ volts peak range over lines 302B to the low pass filter 320. The low pass filter 320 filters out any signals that are of higher frequency than can be converted by the analog-to-digital converter 350 and extends this signal to line 322 for delivery through the multiplexer 330. The A/D converter 350 through multiplexer 330 samples the AC signal 400, in the preferred embodiment, sixteen times per cycle. This is indicated in FIG. 4 for a period of the sine wave 400 having sixteen equal time segments (0 to 15). It is understood that any convenient number of time intervals could be used.

The multiplexer 330 under control 364 of the digital signal processor 360 delivers a sample of the waveform 400 at the sixteen equal time intervals shown in FIG. 4. For each of the time intervals of sampling (0–15) the analog-to-digital converter 350 digitizes each analog sample into a digital value and delivers that digital value over lines 344 to the digital signal processor 360.

The digital signal processor 360 under control of the software in EPROM 362 ascertains the true points 410 and 414 of the zero crossing (here from negative to positive). The digital signal processor 360 is also capable of determining the RMS value 420 of the signal 400 as well as the positive and negative peak values 430 and 432. The process for determining the zero crossings, RMS value and the peak values will be discussed subsequently. It is to be appreciated that under the teaching of the present invention, and due to the direct coupling 210 between the DA/RTU 200 of the present invention and the distribution feeder circuits of PT 50 and CT 60, true RMS, peak values and zero crossing readings can be obtained. This is to be compared with the transducers 40 of the prior art approach of FIG. 1 which simply gave specific values at the output of the transducers, such as the RMS values. Such transducers 40 in prior art RTUs were incapable of generating true crossover indications. Finally, the use of such transducers, over time, caused drift in the system.

Figure 5A:
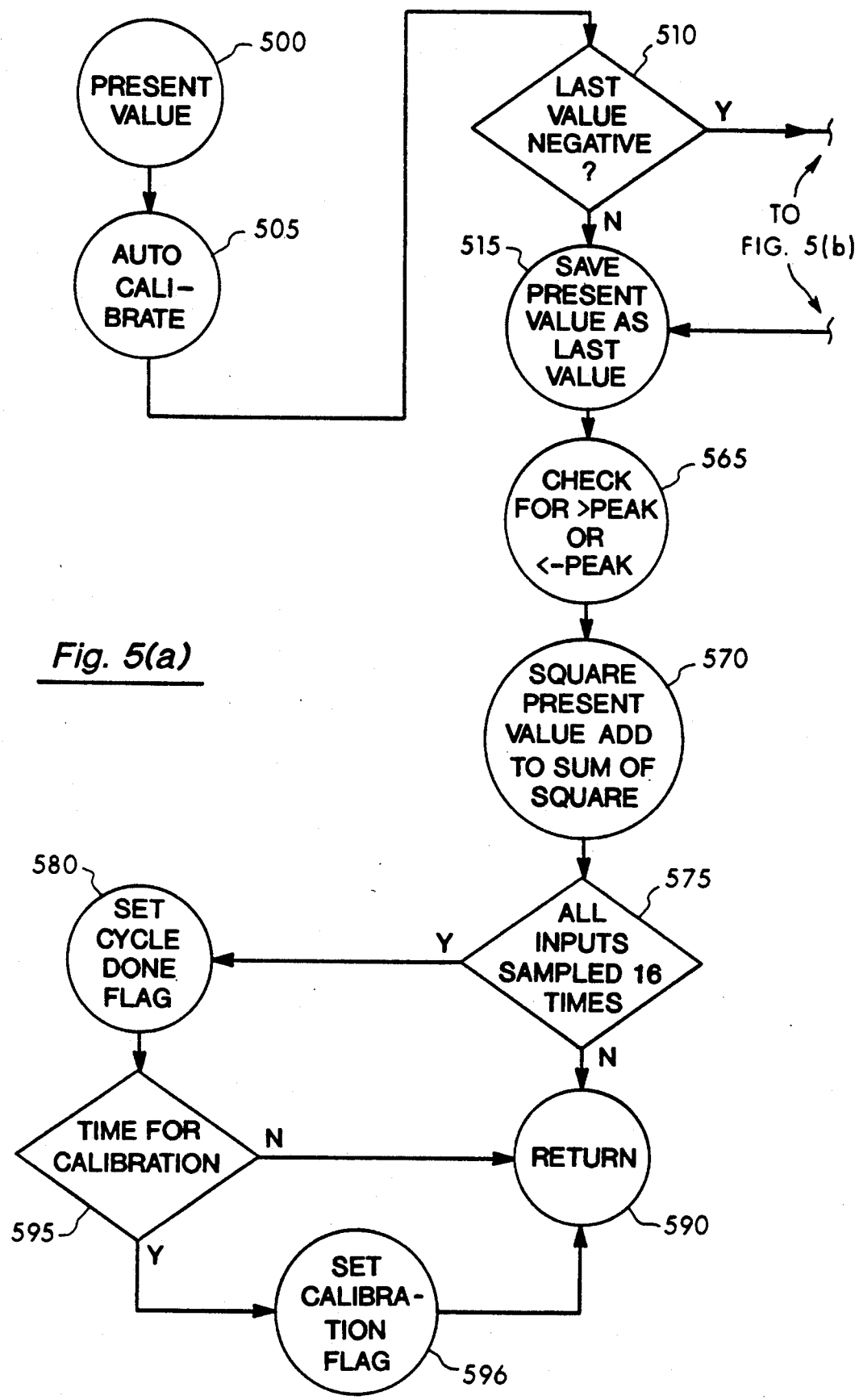
FIGS. 5A and 5B are flow charts showing the operation of the present invention in determining zero crossing, period validation, peak detection and RMS calculations.
Figure 5B:
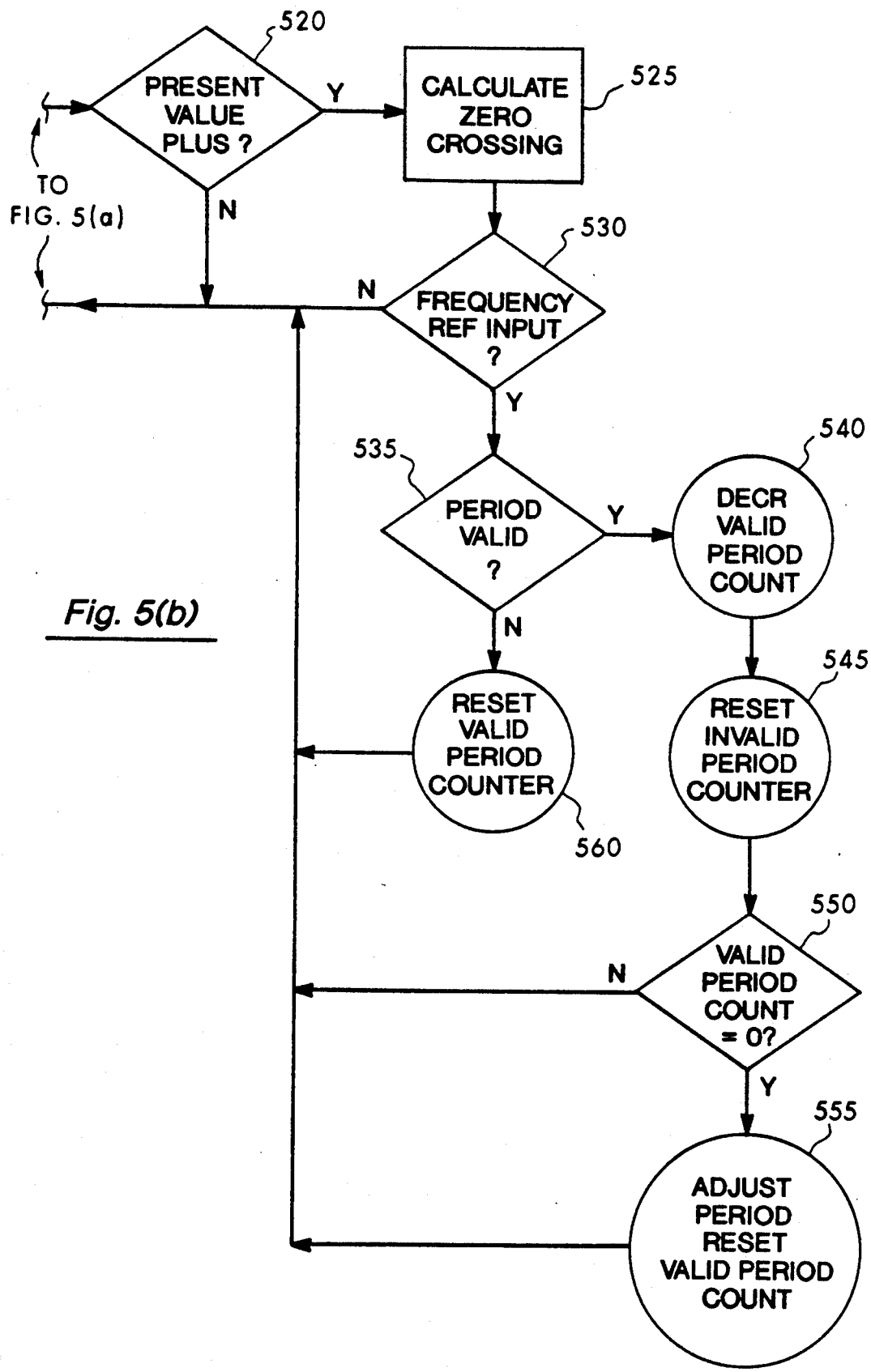

The present invention is capable of detecting faults on the distribution feeder 30 that could not be detected by the prior art RTUs of FIG. 1. An example of this is also shown in FIG. 4 with curve 450. Curve 450 occurs when the CT 60 is driven into saturation. If a prior art transducer 40 were interconnected to the CT 60, that transducer would indicate a much lower RMS value 460 for curve 450. In FIG. 1, the transducer 40 would generate the lower RMS value 460 and thus not be indicative of a fault. Therefore, even though a fault condition occurs on the distribution feeder 30, a prior art transducer would not be capable of detecting that fault. Under the teachings of the present invention, however, and as will be explained subsequently, the curve 450 will be analyzed and will be considered a fault condition. As will be explained subsequently, under the teachings of the present invention, the processed signal 450 will be shown to be the signal representing a fault condition due to the peak value rather than the RMS value In FIGS. 5A and 5B the overall flow chart showing the operation of the digital signal processor 360 is shown. In FIG. 5A, a discrete input signal value of the waveform 400 is received. As mentioned, this is a digital value. This occurs in stage 500 and is termed the "present" value. Next, the system performs autocalibration in stage 505. This stage of operation will be discussed subsequently in greater detail. The process then enters stage 510 and a determination is made as to whether or not the "last" inputted value was negative. If it was not negative (i.e., the positive portion of curve 400), then stage 515 is entered. Here, the present value is substituted for the last value. On the other hand, if the last value 500 was negative, then stage 520 is entered (see FIG. 5B). If the present value is still negative, then again stage 515 is entered and the present value is substituted for the last value. If the present value is positive, then stage 525 is entered and a zero crossing calculation is made. Simply stated, when curve 400 crosses zero, the last value was negative and the present value is positive. Again, the determination of the zero crossing will be discussed subsequently. It is to be expressly understood that the precise point that the curve 400 crosses zero (from negative to positive at points 410 and 414 of FIG. 4) will be determined in this stage of processing. The zero crossing from positive to negative could also have been used.

a. Calculating Zero Crossing Time

Figure 6:
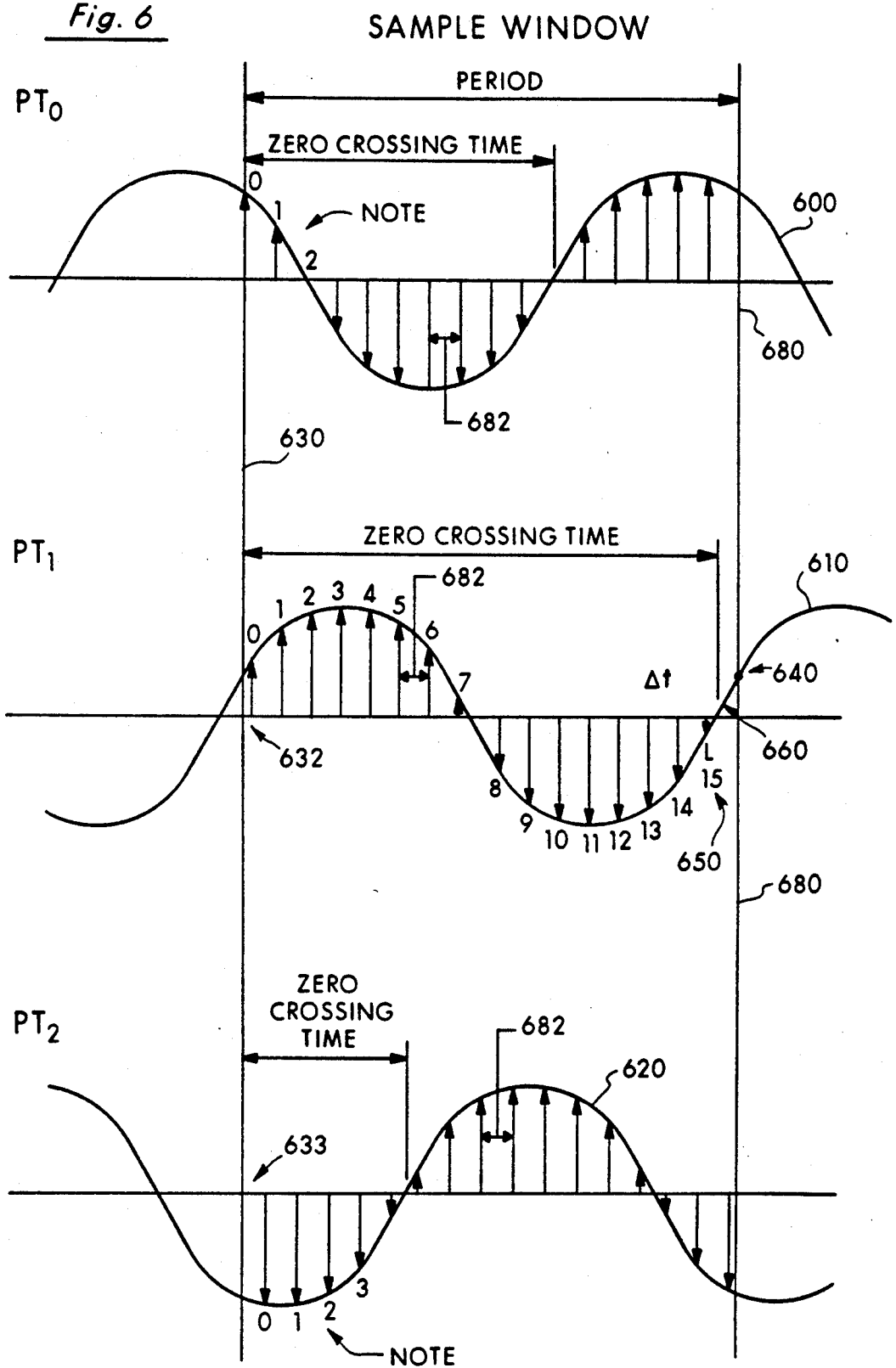
FIG. 6 is a graphical illustration showing three phases of a feeder line as detected by three potential transformers illustrating the process of sampling.

In FIG. 6, the calculation of determining the point of zero crossing is illustrated. In FIG. 6, three signals 600, 610, and 620 are shown 120° apart (representing signals on a three phase line in the distribution feeder). For purposes of illustration it may be assumed that curve 600 is generated by $PT_o$, curve 610 by $PT_1$ and curve 620 by $PT_2$. The operation of the stage 525 will be discussed with reference to curve 610. With reference back to FIG. 3, the multiplexer 330 delivers the sample signals into the gain and buffer circuit 340 in the following sequence of points: $PT_o$, $PT_1$, $PT_2$, etc. Hence, in FIG. 6, the first sample for $PT_0$ is delivered at a time designated at 630 which is a reference time line. The first sample for PT1 is offset 632 from the time line 630. The offset time, in the preferred embodiment with sixteen separate signal inputs into the multiplexer 330, is equal to 1/16th of the time interval 682 between samples, (e.g., sample time 1 interval one and sample time interval 2). Likewise, $PT_2$ is sampled 2/16th of the interval 682 later (indicated by 633). With reference back to FIG. 5, and assuming on curve 610 that the present value is indicated at sample 640, the last sample is indicated at 650. Hence, at stage 520 of FIG. 5, the last analog signal value at 650 is negative and the present analog signal value at 640 is positive indicating that stage 525 is entered to calculate zero crossing. In that calculation, a linear approximation as represented by line 660 is made between points 650 and 640.

A linear approximation is sufficient, although it is to be expressly understood that the present invention is not limited by a linear approximation process. When using a linear approximation between samples for 640 and 650, only a 0.014% maximum error is present. The formula for determining the value of Δt is:

$$\Delta t = L/(L+P)$$  Formula 1 where
L = the analog magnitude of sample 650
P = the analog magnitude of sample 640

With the determination of the Δt value, and knowing the value of the offset designated at 632, then the zero crossing time as indicated by arrows can be determined as follows:

$$ZCT = offset\ 632 + interval + \Delta t$$  Formula 2 where:
ZCT = the zero crossing time from reference line 630
offset = sample number/16
interval = interval number For example, if it is assumed that each interval 682 of time is given the timing value of 1.00, then the sample number at point 650 is "15" indicating 15 time intervals 682 from reference line 630. The value of the offset for $PT_1$ is 1/16 or 0.0625. And if it is assumed that the sampled analog value of the last value 650 L is 0.3 volts and of the present value 640 is 0.7 volts, than Δt is equal to 0.3. Hence, the value for the zero crossing time in this example is:

$$\begin{aligned}ZCT &= 0.065 + 15 + 0.30\\ &= 15.365 \text{ time units from reference line } 630\end{aligned}$$

In this manner, the zero crossing times for each curve (i.e., $PT_0$, $PT_1$, $PT_2$, etc.) can be precisely ascertained with respect to reference 630.

b. Establishing a Frequency Reference and Period validity

With reference back to FIG. 5B, the next stage that is entered after calculating zero crossing is 530. Stage 530 uses one of the curves 600, 610, 620, etc., corresponding to the inputted waves to the multiplexer as a frequency reference input. The prior discussion used curve 600 for $PT_o$ as the reference. The purpose of this stage 530 is to dynamically adjust and set a reference frequency. Under the teachings of the present invention, one of the input waves, for example, that for $PT_o$, as shown by curve 600 of FIG. 6 having a period T, is used as the reference wave. 25 If there is no signal at $PT_o$, the present invention will dynamically adjust to the next available signal and lock on to that signal as a reference.

Stage 535 is then entered to ascertain whether or not the period is valid. This is an important aspect of the present invention in that the period T may change for several reasons. First, the line frequency on the feeder can vary such as between 59.5 Hertz to 60.5 Hertz.

Additionally, the internal clock, which in the preferred embodiment is an 8 megahertz clock, and the associated circuitry therewith may vary or drift. Because it is important to have sixteen equal time intervals within a cycle, a determination is made as to whether or not the period T is valid.

A standard point of reference is stored within the signal processor wherein the sixteen equal time intervals 682 must fit within the period T just measured based upon the calculated zero crossing within a particular tolerance based upon the cycles of the system clock. If the calculated period based upon the zero crossing as calculated in stage 525 is valid, stage 540 will be entered.

Stage 540 simply decrements a counter which in the present invention contains a count of three. Hence, the counter is decremented by one in stage 540. Then stage 545 is entered which resets a comparable invalid period counter which, in the preferred embodiment, is also set to a count of three. This operation will be explained subsequently.

Stage 550 is now entered. If the counter which was decremented in stage 540 for a valid period has been decremented to zero, then stage 555 is entered wherein the period is adjusted. In stable conditions, wherein the frequency has not varied, and wherein the system clock is stable, then no real adjustment occurs in stage 555. However, in this stage, the prior period is averaged with the present. For example, if the prior period was 16 intervals 682 which constitutes 960 intervals per sec for a 60 Hz signal, then with a system clock of 8 MHz, a period would have 133,333 clock pulses. If in stage 535, the accepted time range for a period T is 133,333±1000 clock pulses, and the present period is 133,433 and the prior period was 133,033, then the new averaged period is 133,233 time intervals. It is also to be understood that any suitable tolerance value could be utilized under the teachings of the present invention. The purpose of determining a period being valid or invalid is simply to match sixteen equal time intervals within a given tolerance into a single period for the waveform. Hence, in the above example the adjusted period would deliver the sample intervals of (0–15)—with intervals 682 of FIG. 6 equal to 8327 clock cycles (this is to be compared with the present period of 8340 clock cycles and the prior period of 8315 clock cycles).

With each calculation of the zero crossing, the adjustment of the value for the period occurs in stage 555 so as to better match or hone in on the provision of providing sixteen equal time intervals for each period. Hence, the output of stage 555 is used to adjust the sixteen time intervals 682 for the next set of measurements. The adjustment is done by the DSP 360 and the new intervals 682 are delivered over lines 364 to the multiplexer 330.

c. Peak and RMS Determinations

At this point, stage 515 is entered and the present value replaces the last value. If, however, the period is invalid on stage 535, stage 560 is entered and the valid counter is reset, in the preferred embodiment, to a count of 3. Stage 560 also enters stage 515 to save the present value.

Stage 565 is now entered wherein the voltage value for the present value is compared to the current peak value. Stage 565 is looking for the greatest positive value for the positive peak and the least negative value for the negative peak. As the sample intervals are taken for a given point, only the highest positive and lowest negative values, as the intervals go through an entire period, are obtained. For example, in FIG. 6, the peak value for curve 610 for the positive peak occurs at sample number 3 and the peak value for the negative peak occurs at sample number 11.

Stage 570 is then entered. The square of the present sample value is added to the cumulative sum of squares and this information will be used in calculating the RMS value.

For example, in FIG. 6, the sum of squares calculation for the fourth sample for curve 610 is:

$$CS = (V_0)^2 + (V_1)^2 + (V_2)^2 + (V_3)^2 \qquad \text{Formula 3}$$

where CS = the cumulative sum of the samples squared.

Then stage 575 is entered. If a complete period has been sampled (i.e., 16 samples), then in stage 580 a done flag is set indicating that the cycle or period T is finished. If all existing samples have not been obtained, stage 590 is entered for a return which will be discussed with respect to FIG. 6. Once the done flag has been set, stage 595 is entered which is a real time clock in DSP 360. Under the teachings of the present invention, autocalibration is set to occur every minute and if the timer has indicated the passage of the minute, stage 596 is entered. If not then the calibration flag is not set.

Figure 7:
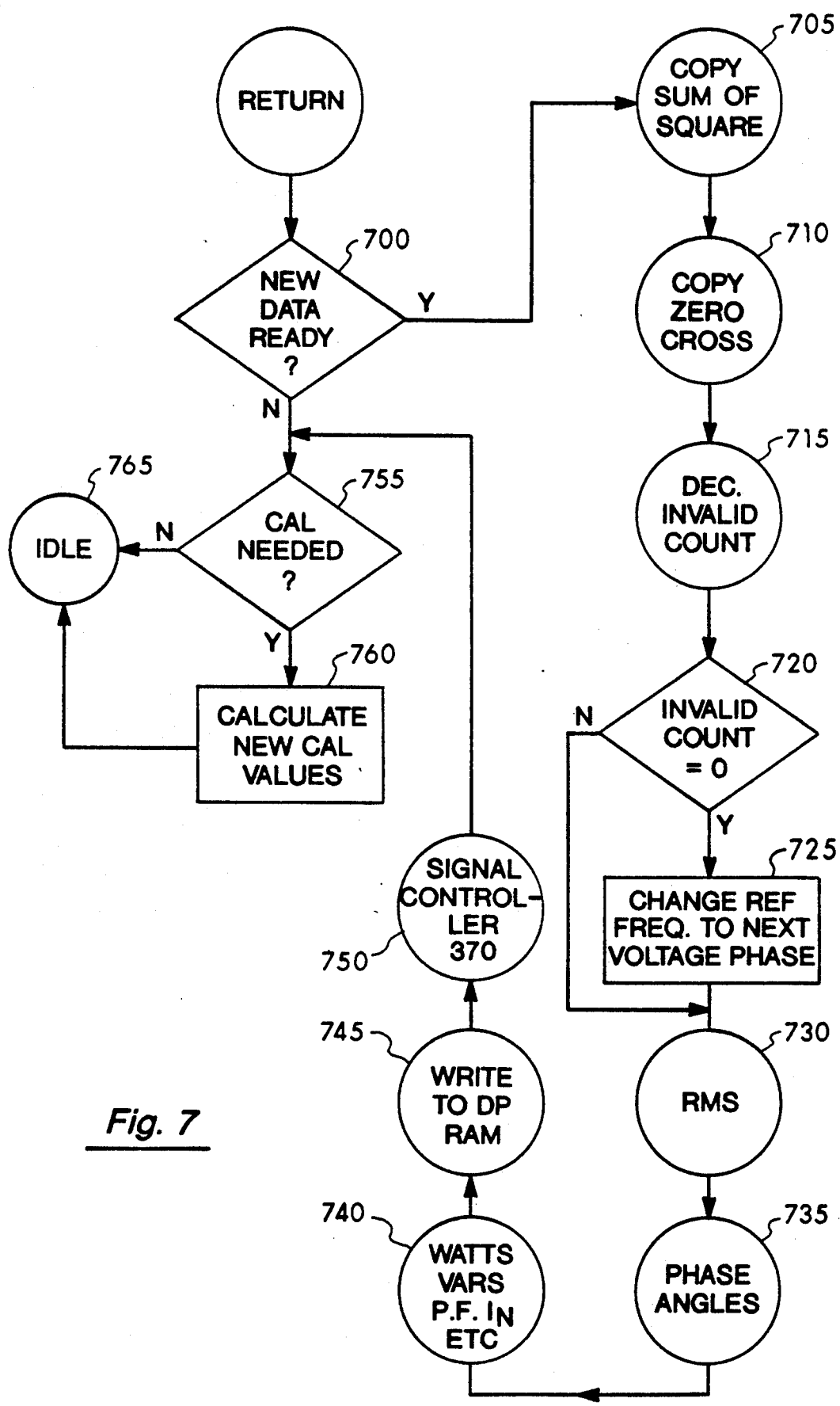
FIG. 7 is a flow chart setting forth the calculation of the RMS, phase angles, and other values of the present invention.

In FIG. 7, the calculation by the DSP 360 of the RMS values, phase angles, and other signal parameters for the waveforms necessary to perform information analysis, is set forth. In FIG. 5, the return stage 590 is repeated in FIG. 7. If the cycle done flag in stage 580 has been set, then stage 700 enters stage 705 wherein the sum of squares (Formula 3) determined in stage 570 is copied into an internal buffer in the digital signal processor 360. The internal buffer now has entered the sum of squares for a period of the waveform. The buffer utilized in stage 570 is then cleared for the next round of calculations for the next period. Stage 710 is then entered wherein the zero crossing times determined in stage 525 are copied into another internal buffer and the buffer used in stage 525 is cleared for the next period of sampling.

The above activities represent housekeeping chores to preserve the accumulated data from a completed cycle of sampling and to clear the temporary buffers so as to start accumulating data for the next cycle.

Stage 715 is then entered wherein the invalid counter of stage 545 is decremented by one. Hence, if in the discussion of FIG. 5, the period was valid (i.e., within the acceptable tolerance of clock cycles for a period) in stage 535, stage 545 resets the invalid period counter to, in the preferred embodiment, a count of three. Stage 715 decrements that counter from three to two. Obviously, in the next cycle, if the period is still valid in stage 535, then the invalid counter in stage 545 would be reset from 2 back to 3 and, therefore, in normal operation the invalid period counter in stages 545 and 715 oscillates between 3 and 2.

However, if in stage 535 the period is not valid, then each time stage 715 is entered the counter counts down from 3 to 2 to 1 to 0 and, therefore, if in stage 720, the count = 0, then the stage of 725 is entered. Essentially, this means that there have been three successive failures of the validity of the period T, and at this point, the system dynamically seeks a new reference voltage and will go to the next voltage phase. For example with reference back to FIG. 6, it was initially stated that curve 600 for $PT_o$ was the voltage for the reference frequency, but should this fail for three successive times (i.e., the invalid period counter going from 3 to 0) then PT$_1$ would become the next voltage for providing the reference frequency.

On the other hand, if the invalid period counter in stage 720 is not equal to zero then stage 730 is entered (which is also entered upon completion of stage 725) and the RMS values are calculated from the sum of squares.

d. Calculation of RMs, Filtered RMs, and Phase Angles

Figure 8:
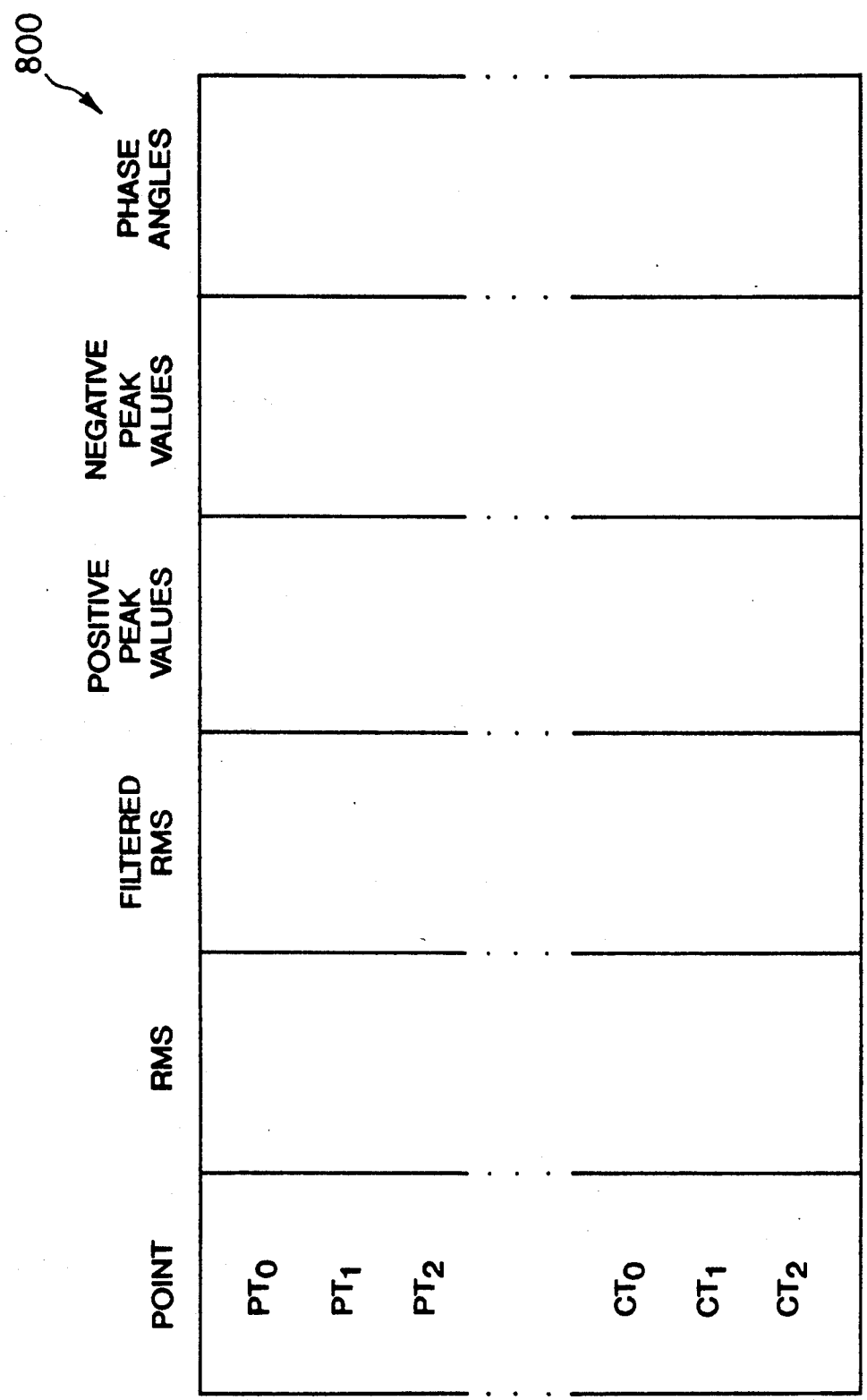
FIG. 8 sets forth the memory configuration for storing the values as calculated by the flow chart in FIG. 7.

The calculated RMS values are stored in the dual port RAM 380 in a memory configuration 800 such as is shown in FIG. 8. In FIG. 8, a preferred memory arrangement 800 in the dual port RAM 380 is shown wherein each of the twelve points serve to index a table containing RMS values, filtered RMS values, positive peak values, negative peak values, and phase angles.

RMS is conventionally calculated as follows:

$$RMS = K\sqrt{CS} \qquad \text{Formula 4}$$

K = scaling constant

Filtered RMS is determined by:

$$RMS_F(n) = \sum_{K=0}^{N-1} h_K * RMS(n - K) \qquad \text{Formula 5}$$

where $RMS_F(n)$ = filtered RMS at time n, $h_k$ = filter coefficients for FIR filter designed using Hanning window.

It is to be expressly understood that other similar information on a per point basis (i.e., PT or CT) could be placed in the table such as, for example, crest factor values. The formula determining crest factor is:

$$CF = \text{Crest Factor} = PEAK/RMS \qquad \text{Formula 6}$$

For a Sine Wave CF=1.414

Following calculation of the RMS values in stage 730, stage 735 is entered in which the phase angle for the wave is calculated and entered into table 800. The phase angle is based upon the zero crossing time information and it can be quickly determined from reference line 630 as shown in Figure 6. This calculation is important in the power factor calculations of the next stage 740.

In FIG. 18 the calculation of the phase angle is shown. The calculated zero crossing times are copied into an internal buffer in the DSP 360. This occurs in stage 1800 of FIG. 18. In stage 1810 the copied zero crossing times are decremented by a period (i.e., 1/f). Then, in stage 1820 phase angle A is determined by taking the zero crossing time for voltage A and subtracting the zero crossing time for current A. Phase angle B is determined in stage 1830 by calculating the difference between the zero crossing time for voltage B and the zero crossing time for current B. Finally, phase angle C is calculated in stage 1840 wherein the difference between the zero crossing time for voltage C and the zero crossing time for current C is taken. Based upon these determinations, the phase angles are quickly determined for the three phases A, B, and C of a feeder 30 and these are stored in memory 800 of the dual port RAM.

The direction of the current in the feeder can be quickly determined from the phase angles. In Figure 3, current I normally flows in the direction shown and the corresponding phase angles would be positive. However, in backfeed conditions where I is flowing the reverse direction, the phase angles would be negative or shifted by 180°.

e. Calculation of Watts, VARS, and Power Factors

Figure 9:
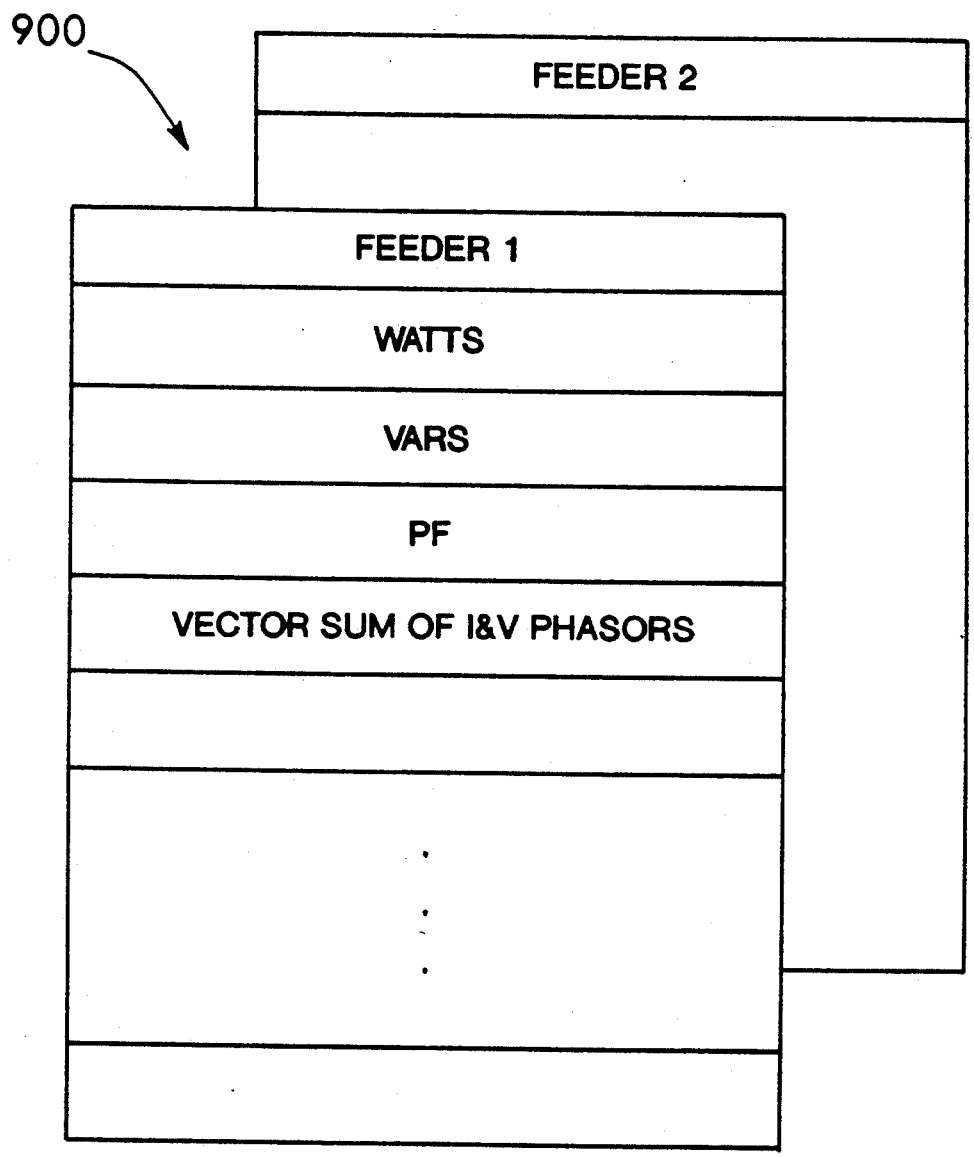
FIG. 9 sets forth the memory configuration where the values of watts, VARS, power and other values as calculated by the flow chart of FIG. 7 are stored.

Stage 740 determines other various calculations for the signals on a per feeder basis and stores this information in the dual port RAM 380. A preferred memory configuration 900 is shown in FIG. 9 wherein each feeder serves as an index to a table wherein the watts in the feeder, the VARS, power factors, sum of current phasors, sum of voltage phasors, etc. are determined. A feeder is composed of three pairs of PTs and CTs.

In stages 745, the values determined in stage 730, 735, and 740 are written into the tables of FIG. 8 and FIG. 9 in the dual port RAM 380. The microcontroller 370 is signalled in stage 750 which passes control of the dual port RAM over to the microcontroller 370 as will be subsequently discussed. The microcontroller 370 thereupon utilizes the signal values in the dual port RAM 380 as represented in FIGS. 8 and 9 to perform different types of analysis and this will also be discussed subsequently.

f. Autocalibration

Stage 755 is now entered which determines whether or not a calibration is needed. If a calibration flag has been set as discussed with respect to stage 596 of FIG. 5, then stage 760 is entered and new calibration values will be calculated. When finished the idle stage 765 is entered.

In FIG. 15, the autocalibration feature of the present invention is performed by the digital signal processor 360, in the preferred embodiment, every minute. In FIG. 3, three calibration references 332 are provided over lines 336 through the multiplexer 330 and to the digital signal processor 360. In FIG. 15, the digital signal processor enters a routine every minute 1500 wherein it takes the average of the last four samples from the multiplexer 330 for each of the full scale values (+5, −5) and the zero input. For example, if the prior four readings for the positive full scale (FS) were: 5, 5, 5.1, 5, then the average would be 5.025. Then, stage 1510 is entered. This stage utilizes a conventionally available library function called Finite Impulse Response (FIR) which functions as a digital filter. The FIR function takes the prior sixteen averages of, for example, the full scale and generates a filtered average. Filtered averages for FS, −FS, and 0 are then utilized in stages 1520, 530, and 1540. The zero offset is set to filter value of the zero reference value. Likewise the positive range equals the filter FS value from stage 1510 less the filter zero value and the negative range equals the filter zero value less the filter negative FS value.

These values are used in FIG. 16 to calibrate the raw values from the multiplexer 330. This occurs as follows. The raw value as sampled by the multiplexer 330 is read (as a digital value) in stage 600. First, the zero offset as determined in stage 1520 is subtracted from the raw value in stage 1610. Next, the difference is multiplied by a full scale value which in the preferred embodiment is $2^{12}$. This provides correction for the gain in circuit 340. in stage 1630, it is determined whether the multiplied raw value is negative or positive. If positive, stage 1640 is entered and the calibration occurs by dividing the multiplied raw value by the positive range value from stage 1530. If negative, stage 1650 is entered and the multiplied raw negative value is divided by the negative range value from stage 1540. Hence, the positive and negative values are then fully calibrated. Calibration in FIG. 16 occurs with every sample although the calibration values are only updated every minute.

Detailed DA/RTU Operation in a Distribution Network

Figure 10:
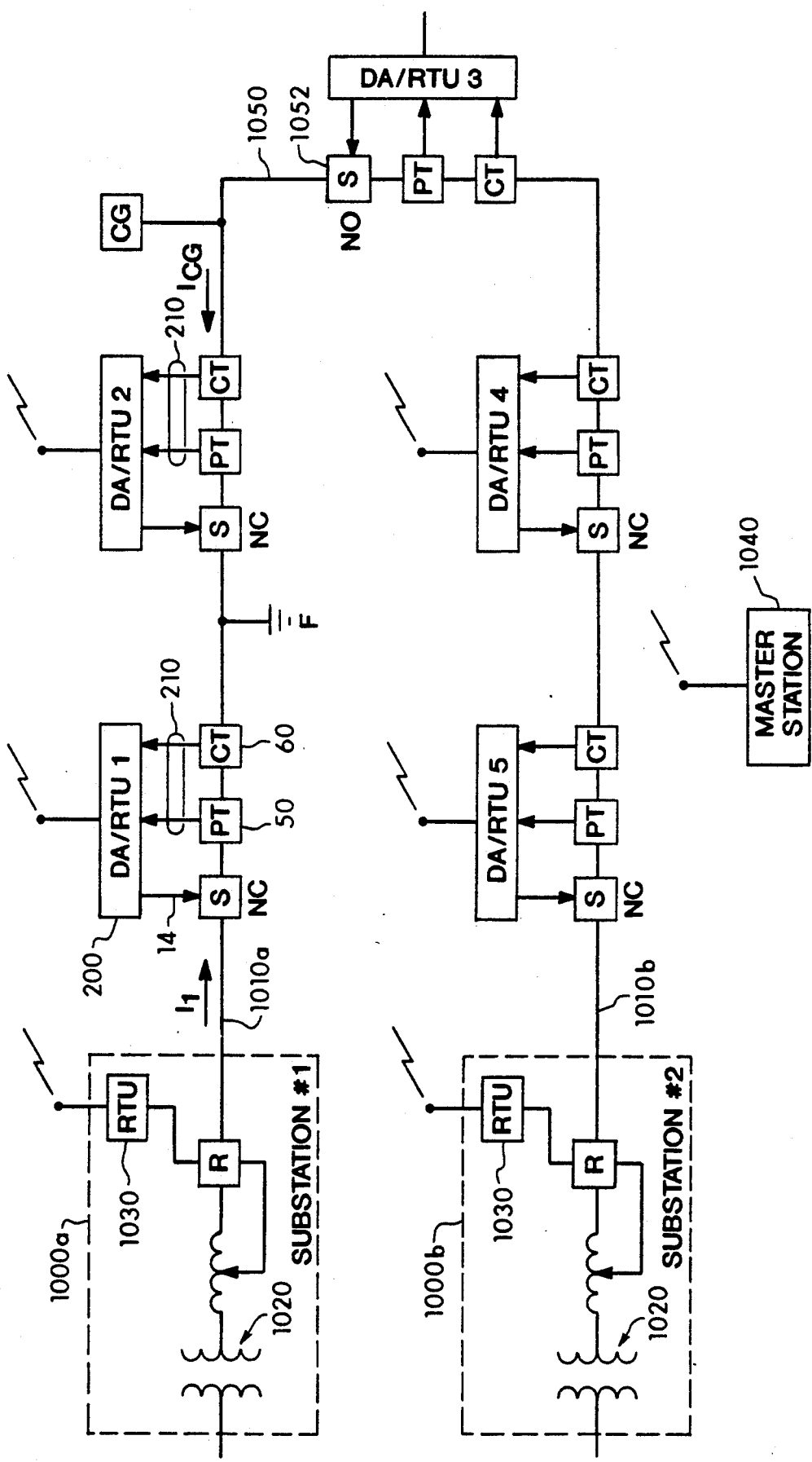
FIG. 10 is an example of the DA/RTUs of the present invention installed in a two feeder network illustrating detection of a fault.

In FIG. 10, a typical distribution network is shown. The network of FIG. 10 has two substations 1000a and 1000b providing power on distribution feeders 1010a and 1010b. Each substation includes a step down transformer 1020 and a reclosure R. Each substation also includes a conventional RTU 1030. The RTUs 1030 are in communication with a remotely located master station 1040. This type of distribution automation is fully discussed in the above referenced IEEE Tutorial Course. The distribution feeders 1010a and 1010b are interconnected through a loop 1050, but the switch 1052 is normally open (no) thereby separating the two feeders 1010a and 1010b in normal operation. The network also has connected to it a conventional co-generator CG such as a windmill. As shown in FIG. 10, the switches S for DA/RTUs 1,2,4, and 5, are normally closed (NC). Hence, in normal operation of the network of FIG. 10, substation 1000a provides power to consumers located along feeder 1010a which power is supplemented by the co-generator CG. Likewise, substation 1000b is responsible for delivering power over feeders 1010b to consumers located on its circuit. As discussed in the background of the art section, DA/RTUs 200 of the present invention are typically located on pole tops along the distribution feeders 1010a and 1010b. While only five DA/RTUs 200 of the present invention are shown, it is to be understood that any number of the DA/RTUs 200 of the present invention arranged in any pattern on feeders 1010a and 1010b could be utilized. For example, if the costs were low enough, one could theoretically place a sufficient number of DA/RTUs 200 to isolate each individual consumer.

As shown in FIG. 10, not only do each of the conventional RTUs 1030 communicate with the master station 1040 but so do each of the individual DA/RTUs 200 of the present invention. What is shown in FIG. 10 is a radio link communication. However, it is to be expressly understood that any communication link could be utilized including fiber optic, cable, or telephone lines.

Each DA/RTU 200 receives its input through the direct couple 210 from each conventional PT 50 and each CT 60 on the feeder 1010. As previously mentioned, up to twelve PTs 50 and CTs 60 could be utilized in any combination. For this environment, one arrangement could be one PT 50 and three CTs 60. In addition, each DA/RTU 200 through the control output 14 selectively activates the switch S between the normally open (NO) and the normally closed (NC) positions.

a. Operation in the Presence of Backfeed

In FIG. 10, a fault F is shown between DA/RTU 1 and DA/RTU 2. This could occur, for example, upon the feeder being grounded. When the fault is placed on the feeder 1010a as shown, the current $I_1$ obtains an overcurrent condition. The reclosure R in substation 1000a responds to that overcurrent by opening feeder 1010a so as to prevent any further delivery of current $I_1$ into the feeder. The DA/RTU 1 through its direct connection 210 to the current transformer CT 60 also detects an overcurrent condition. The DA/RTU 1 optionally may immediately send a signal to the master station as can the RTU in substation 1000a. The software in the master station 1040 would process these signals and ascertain that the location of the fault F was between DA/RTU 1 and DA/RTU 2.

This would be true if the co-generator CG were not on feeder 1010a. However, the co-generator is delivering a current $I_{CG}$ onto feeder 1010a. This current is sensed by CT 60 of DA/RTU 2. Since it is flowing in the reverse direction (i.e., backfeed), the DA/RTU 2 does not raise a fault signal. Hence, under the teachings of the present invention, the location of fault F is properly located between DA/RTU 1 and DA/RTU 2.

Now this is to be compared with conventional RTUs of FIG. 1 which require a separate and expensive backfeed detector 92 and which require a separate and expensive overcurrent fault detector 90. In the fault condition set forth in FIG. 10, the conventional RTU operates as follows. For purposes of clarity, the following discussion assumes that a conventional RTU replaces each DA/RTU FIG. 10 (e.g., RTU 4 would be located at the position of DA/RTU 4). RTU 1 would have its overcurrent fault detector 90 detect the overcurrent condition of $I_1$. The RTU 2 having an overcurrent detector 90 and a backfeed detector 92 would also detect an overcurrent caused by $I_{CG}$, but its backfeed detector 92 would indicate that the current is flowing in the reverse direction and, therefore, negate detection of a fault. This is shown in FIG. 1 by the operation of invertor gate 98. Hence, when the backfeed detector 92 indicates a high to the input of gate 98, the low output of gate 98 prevents the overcurrent fault detector 90 from sending a signal to the RTU. Hence, the prior art RTU is capable of isolating the fault between RTUs 1 and 2. However, the prior art approach requires separate circuits for overcurrent fault detection 90 and backfeed detection 92 as well as a separate sensor 94.

If the conventional RTU does not have a backfeed detector 92, then a substantial problem would arise in location of the fault by the master station 1040. In this situation where separate backfeed detectors 92 are not found in the conventional RTU 1 and RTU 2, then both would indicate overcurrent detection thereby placing the fault between RTU 2 and RTU 3, which of course is incorrect.

Hence, the present invention by fully integrating overcurrent detection and backfeed detection through direct coupling to the PTs 50 and the CTs 60 fully eliminates the problem of incorrectly reporting conditions that may falsely locate the fault on the network to the master station 1040.

b. Operation for Detection of Overcurrent

Figure 11:
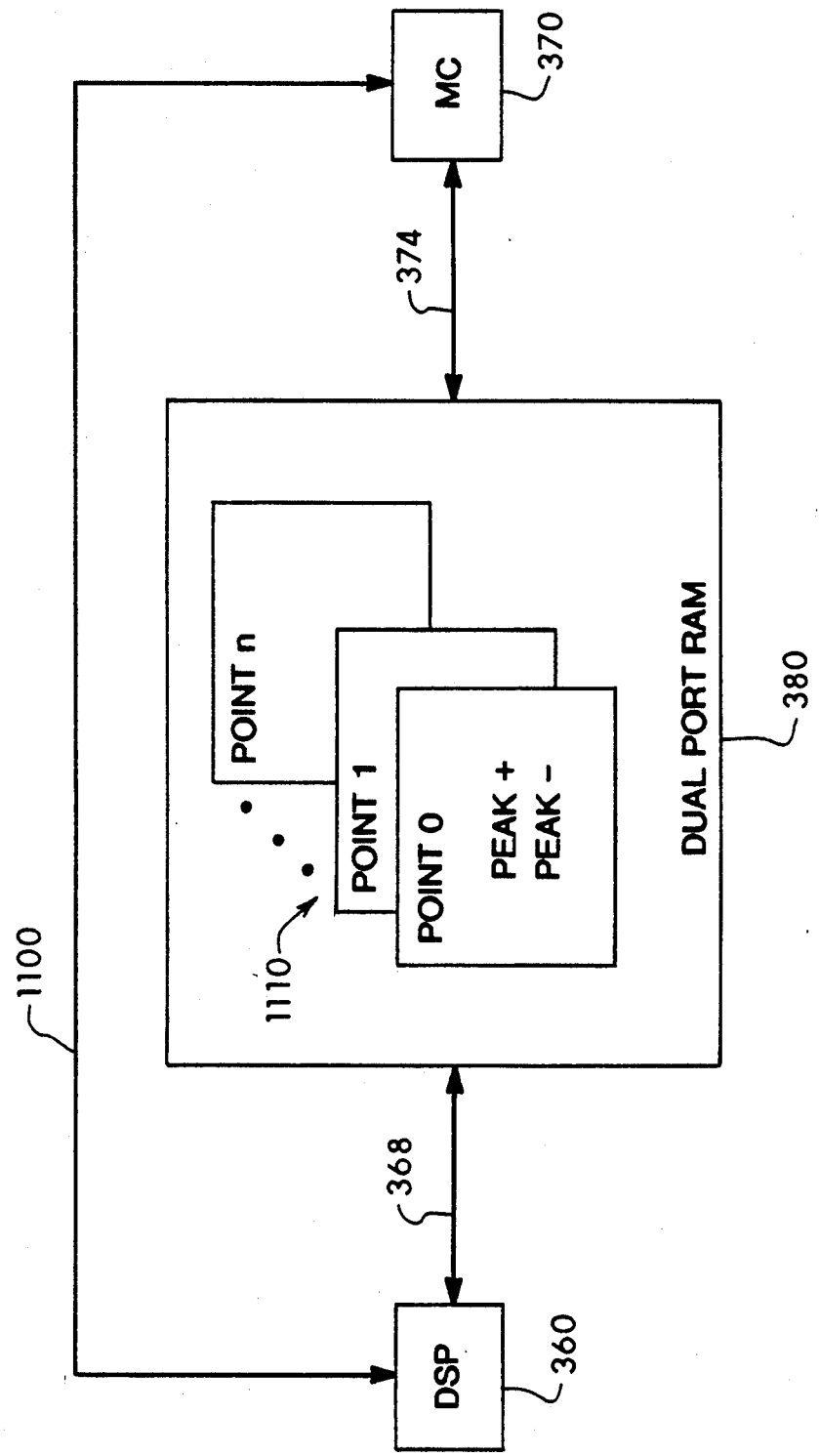

In FIGS. 11 and 12, the overcurrent detection process which is fully integrated into the DA/RTU 200 of the present invention is set forth. As explained with the discussion with respect to FIG. 6, the positive and negative peak values of a given input cycle are detected and stored in the dual port RAM 380. For example, in FIG. 6, the peak value for $PT_1$ occurred at sample number three. The negative peak value occurred at sample number eleven. This process occurred in stage 565 of FIG. 5 and the value is stored in the dual port RAM 380 as shown in FIG. 8.

In FIG. 11, a block diagram representation of the storage of this positive and negative peak information on a per cycle basis for points 0 through n is set forth (n=15 in the preferred embodiment). The digital signal processor 360 ascertains the positive peak and the negative peak in each cycle for each point. This information is stored in the dual port RAM 380 and as shown in FIG. 11, for "n" points, each point has corresponding positive and negative peak current values A similar memory file in the dual port RAM 380 exists for peak voltages. Hence it is to be clearly understood that the discussion concerning FIGS. 11 and 12 is fully applicable to the overvoltage detection. The digital signal processor 360 detects the positive and negative peak voltage which for current in a given cycle is sensed by the CT 60. It writes those values over lines 368 into the dual port RAM 380. At the completion of the cycle the digital signal processor 360 delivers an interrupt command over bus 1100 to the microcontroller 370. The microcontroller 370 then accesses the dual port RAM 380 over bus 374. The positive and negative peak values for current for each point are then read out.

In FIG. 12, the microcontroller 370 then ascertains whether or not the value of the peak information exceeds a predetermine threshold Th either on the positive or on the negative portion of the cycle. If it is not greater than the threshold value Th as determined in stage 1200, then the process returns to the NEXT cycle stage to perform the analysis once again. When the microcontroller 370 enters the NEXT cycle, control is returned over the interrupt bus 1100 to the DSP 360 and the values for the next cycle are obtained. However, if the microcontroller 370 determines that the values read for a particular point do in fact exceed threshold Th, then a counter is incremented in stage 1210. In stage 1220, if the count equals or exceeds a predetermined constant K which in the preferred invention is three cycles or K=3, then stage 1230 is entered and an overcurrent flag is raised causing the radio 80 to transmit an overcurrent condition which is further processed by the microcontroller 370 according to an algorithm stored in EPROM 372. If the count does not equal the predetermined value of K, then again, the microcontroller 370 enters the NEXT cycle stage and performs the same evaluation for the next cycle. It is to be expressly understood that this process is the same for an overvoltage condition. Furthermore, it is to be expressly understood that the value of the threshold Th can be any suitable value which in the preferred embodiment is 400% of peak current value for overcurrent and 200% of voltage value for overvoltage. Likewise, it is to be expressly understood that any value for the predetermined constant K could be used (i.e., K could be as low as one or as high as desired). Clearly, if K were one, a spike appearing on the line would raise an overcurrent flag. Hence, from a practical point of view, K is usually greater than one. The overcurrent detected shown in FIG. 12 applies to the RMS magnitude of the neutral current in calculated in 740 which is also stored in dual port RAM 380. The neutral current magnitude is the magnitude of the phasor sum of the three phase current values.

With reference back to FIG. 11, with each new cycle the files 1110 in the dual port RAM 380 are rewritten and the information is lost. There is no need to archive this information on a cycle per cycle basis although it is to be expressly understood that the invention is not limited to this re-write capability. In other words, if it is desired to store peak information (or, for that matter any of the other information) for more than one cycle, then a suitable expansion of the RAM 380 could be made to store the desired number of cycles of information.

d. Verification of Upstream and Downstream Device Operation

In FIG. 13, a substation 1000 delivers current I into a feeder 1010. On the distribution network is located a DA/RTU 200 of the present invention. The DA/RTU 200 is directly coupled 210 to the conventional PTs and CTs on the feeder 1010. The substation has an RTU 1030. At the substation, the reclosure R is considered an "upstream" device from the DA/RTU 200 because it is upstream of the current I. The upstream device could also be a breaker, a switch, or a fuse. The discussion of FIG. 13 is for a reclosure device but is to be expressly understood that any type of upstream device could have its operation fully detected and verified on a cycle-by-cycle basis by the DA/RTU 200 of the present invention.

In the diagram of FIG. 13, a fault F occurs on line 1010. From an operations point of view, the fault F could be any type of fault and since the nature of the fault is not known, the reclosure R in the substation 1000 operates in a standard reclosure sequence. For example, if the fault is a temporary fault such as a piece of debris or a bird that temporarily causes a short circuit and, therefore, an overcurrent condition, the sequential operation of the reclosure R will detect this temporary fault and then reclose causing the feeder 1010 to be fully functional. On the other hand, if the fault is a permanent fault such as a downed wire, the reclosure R will go through its standard sequence and then indicate a permanent or a lockout condition.

The operation of a conventional reclosing sequence is shown in FIG. 14. In FIG. 14, a conventional reclosure operational sequence is set forth. This is based upon a conventional breaker reclosing sequence.

In FIG. 14, the signals 1400 appearing on the feeder 1010 of FIG. 13 are shown. The signals initially indicate normal current conditions at time interval 1410. An overcurrent condition then occurs on the line shown at 1420 such as caused by the presence of the fault F in FIG. 13. The reclosure R detects the overcurrent as shown by stage 1422 and commences to open the reclosure R for a period of time termed OPEN 1. This is shown to have occurred at time 1430 on the signal chart. Since the fault F could be temporary, the reclosure R after a period of time attempts its first reclosure. This is shown by waveform 1440. However, overcurrent is still detected by the reclosure R and, therefore, the reclosure opens the circuit for a second time period OPEN 2. This is shown as time interval 1450. Once again, the reclosure undergoes a second reclosure and as shown by waveform 1460, during the second reclosure, the overcurrent is still detected and therefore the reclosure R opens the circuit for a third time interval OPEN 3. This is shown as time interval 1470. Most conventional reclosures attempt a third reclosure which is shown by waveform 1480 and if overcurrent is still detected a lockout is entered into as shown by time interval 1490 which completely removes the substation from the feeder 1010. In other words, when a state of lockout is achieved the fault is deemed permanent. If overcurrent is not detected in states 1440, 1460, or 1480, then the fault was temporary and the substation remains connected.

This sequence of operation is conventional and is representative of a number of reclosing devices R. It is to be expressly understood that the actual reclosing sequence, the reclosure time intervals, the open time intervals, and the number of attempted reclosures do not effect the teachings of the present invention. What is clear is that the DA/RTU 200 of the present invention can fully verify and track the operation of the upstream reclosing device R on a cycle-by-cycle basis. For example, and as previously discussed, the commencement of the interval of overcurrent shown by 1420 can be immediately detected by the DA/RTU 200 and transmitted to the master station 1040. Likewise, when the RMS value of the signal falls below a minimum threshold value, then the precise amount of time in the interval of 1430 can be delivered to the master station 1040. Likewise, in the presence of overcurrent 1440, signals representative of this condition can also be delivered to the master station 1040. In this fashion, the DA/RTU 200 can actually track the signals on feeder 1010 corresponding to the operation of an upstream device (or downstream device).

It is well known that master station 1040 can utilize many different types of algorithms to analyze the data coming from the various RTUs 1030 and the DA/RTUs 200. A number of papers have been written on this topic setting forth algorithms for determining fault locations, fault isolation, service restoration and the like. For example see Castro, Bunch, and Topka, in "Generalized Algorithms for Distribution Feeder Deployment and Sectionalizing" presented at the Jul. 15-20, 1979 IEEE Power Engineering Society in Vancouver, B.C.

More importantly, because the DA/RTU 200 is capable of having on-board software located in EPROM 372, the microcontroller 370 can preliminarily process the signal information in the dual port RAM 380. For example, existence of the time intervals for overcurrent and the time intervals for the RMS current being below a threshold value can be processed by controller 370 rather than at the master station 1040 thereby minimizing transmission of data.

An example of the pre-processing abilities of the DA/RTU 200 of the present invention is also illustrated in FIG. 14. Upon detection of the overcurrent 1422 the microcontroller 370 can set a timer to commence counting clock pulses. The characteristics of the reclosure R of FIG. 13 can be selectively loaded into the DA/RTU 200 from the master station 1040. For example, assume that the reclosure R of FIG. 13 has the following time interval characteristics to effect reclosure:

| Time Intervals | Activity |
| --- | --- |
| T1 | Open 1 |
| T2 | First Reclose |
| T3 | Open 2 |
| T4 | Second Reclose |
| T5 | Open 3 |
| T6 | Third Reclose |
| T7 | Blockout |

It is to be understood that these time intervals T1 through T7 can be selected to, for example, correspond to the mid-region of each activity or could correspond to a predetermined time such as thirty seconds after the commencement of an activity. The versatility of the present invention can be immediately appreciated since the device characteristics will vary from vendor to vendor. If a new reclosure device R is substituted in a substation 1000, the master station 1040 or a field installer at the substation can send a command to the DA/RTU 200 of the present invention to provide a new set of time intervals T1 through T7 or add or subtract time intervals as required. Likewise, new values for overcurrent could also be set and the like.

In operation, upon the commencement of overcurrent 1422, the microcontroller 370 commences to count with its timer. When a time interval T1 is detected, the microcontroller will ascertain the status of the signals on the feeder 1010 which should verify the existence of no signal 1430 (i.e., open #1). When the counter counts to T2, the microcontroller will again evaluate the condition of the signal on feeder 1010 and if it is in an overcurrent condition 1440, that will be recorded (i.e., 1st reclose). This process repeats for the full seven time intervals which would then indicate a lockout.

As stated above, the microcontroller 370 can communicate through radio 80 information to fully reconstruct (i.e., fully verify the operation of the reclosure device R) the signal pattern of FIG. 14 and deliver that to the master station 1040 (i.e., no preprocessing); or it could tabulate the signal conditions at the end of each of the time intervals T1 through T7 which summarize the operation of the reclosure device at the expected stages of operation; or, the microcontroller 370 can simply report on the condition of T7 as being normal or in loss of current which would indicate a lockout condition (i.e., an overall flag indicating a permanent ground or a temporary ground).

It is to be appreciated that any suitable algorithm for generating indications or flags concerning the operation of an upstream or downstream device can be preprocessed in the microcontroller 370 and the suitable indicators transmitted to the master station 1040. It can also be appreciated that time intervals and voltage and current values for particular upstream and downstream devices can be selectively programmed, at any time, into the DA/RTU 200 of the present invention by updating tables located in nonvolatile memory of the microcontroller 370.

The present invention enables the DA/RTU to ascertain precise waveform data and then to generate summary information based upon that data (e.g., RMS, peak values, etc.) which can then be extended to the master station over the communications link. This preprocessing of data into summarized information, flags and other suitable indicators at the location of the DA/RTU (e.g., pole top) is an important feature of the present invention and which reduces the amount of information being delivered to the master station as well as significantly reducing the processing workload of the master station.

e. Cold Load Pickup, Magnetization, and Fault Current

In FIG. 17, the signal conditions on a feeder are shown for three separate states: cold load pickup (FIG. 17a), magnetization (FIG. 17b), and fault current (FIG. 17c). When a substation such as substation 1000 in FIG. 13 has been off line during the time that the fault F is being removed and the feeder, line 1010 being repaired, no current I is delivered. However, upon turn-on a cold load pickup condition such as shown in FIG. 17a can occur. While there is initially zero current, up to five times normal current can be produced upon reconnection of the substation to the feeder 1010. This is simply due to the fact that a number of customers may have all their appliances (furnaces) turned on and there is an initial surge of current. Hence, an overcurrent will be detected and stored in the dual port RAM. However, a time interval of five to ten minutes is set by an internal timer in the microcontroller which will ignore these overcurrent conditions until the line settles into a normal current. Again, this time interval of five to ten minutes, typically, can be set from the master station. Hence, when the count equals the set level, for example seven minutes, and the current is normal, the microcontroller can be programmed either to report this condition to the master station or not to report it. On the other hand, if an overcurrent is present, the microcontroller can be programmed to report that condition to the master station.

In FIG. 17b, when a number of transformers are connected to the feeder, magnetization occurs wherein upon turn-on up to thirty times normal current can exist on the line. Again, a timer can be internally set in the microcontroller such as a time frame typically less than one minute in which to re-sense the condition of the signals on the line to make sure the normal current state has been achieved. Again, this condition state can be selectively reported or not to the master controller. Finally, FIG. 17c shows a continuing permanent fault condition which can be readily detected by the present invention as previously discussed.

f. Self-Checking Abilities

The present invention also provides a degree of self-checking. For example, a PT 50 or a CT 60 may become defective by, for example, going into over saturation. This is illustrated in FIG. 4 by curve 450. Additionally, the transformers T1 and T2 may also become defective and affect the shape of the AC signals being delivered from PT 50 or CT 60. Likewise, the low pass filters 320 may also become defective and affect the shape of the AC signal being delivered from the distribution feeder 30. A sine wave exists on distribution feeder 30. A defect in a PT or CT, or transformers T1 and T2, or in the low pass filters 320 may well affect the shape of this true sine wave. The present invention provides a degree of self-checking since a true sine wave maintains a crest factor of 1.414.

As discussed, the digital signal processor calculates the crest factor and delivers the crest factor calculation to the dual port RAM 380. The microcontroller 370 can be suitably programmed by means of a program in the EPROM 372 as shown by the flow chart of FIG. 19. In FIG. 19, the self-check routine 1900 is entered and the crest factor CF for a given cycle is compared to a value of 1.414 in state 1910. If the crest factor stored for a given cycle in the dual port RAM 380 is within a predetermined range of 1.414 such as, for example, 1.1 to 1.7, then a return 1920 is entered. However, if at stage 1990 the calculated crest factor CF is outside of the range, then stage 1930 is entered. Whether or not an overcurrent (or as the case may be is detected and stored in the dual port RAM 380 for that cycle is important. If an overcurrent condition is present, the overcurrent can cause saturation of the CT 60 and, therefore, the CT 60 is not defective. Again, return 1920 is entered. However, if there is no overcurrent condition, then the CT 60 is defective and an error flag is raised in stage 1940. This error flag is subsequently extended in stage 1950 away from the DA/RTU to the Master Station 1040. It is to be expressly understood that while FIG. 19 shows the determination of whether or not the crest factor is within an acceptable range first, that the overcurrent determination could be made first followed by the determination of the crest factor.

In summary, it is to be expressly understood that this feature provides a self-check of the front end components of the DA/RTU of the present invention as well as the integrity of the PT 50 and the CT 60. It is also to be expressly understood that while the above is a exemplary range, that any suitable range of acceptability could be programmed into the DA/RTU of the present invention and that this value (i.e., the range) could also be selectively changed at the Master Station by transmitting a new range from the Master Station into the radio 80 and into the microcontroller 370. Hence, the range is "settable" from a remote location. Furthermore, the self-checking abilities of the present invention are not to be limited to the use of PTs 50 and CTs 60, but would also self-check interconnections with line post sensors or the like.

It is to be expressly understood that the claimed invention is not to be limited to the description of the preferred embodiment but encompasses other modifications and alterations within the scope and spirit of the inventive concept.

We claim:

1. An improved distribution automation remote terminal unit for connection to a plurality of potential sensors and to a plurality of current sensors, said plurality of potential sensors being connected to an AC distribution feeder for sensing the AC potentials in the lines of said distribution feeder, said plurality of current sensors being connected to said distribution feeder for sensing the AC currents in said lines, said improved distribution automation remote termination unit comprising:

first means connected to each of said plurality of potential sensors for producing a potential signal of reduced peak-to-peak voltage corresponding in phase to only the AC potential waveform on said distribution feeder, second means connected to each of said plurality of current sensors for producing a current signal of reduced peak-to-peak voltage corresponding in phase to only the AC current waveform on said distribution feeder, means receptive of said potential and current signals from said first and second producing means for sampling the voltage of said potential and current signals a predetermined number of times per cycle to produce a digital value for each sampled voltage, means receptive of each said digital value from said converting means for processing the crest factor, overcurrent, and overvoltage parameters for a selected cycle of said plurality for sensed AC potentials and currents in said distribution feeder, said processing means further determining the operation of said potential and current sensors and of said first and second producing means, said processing means raising an error flag indication in the event that the crest factor for said selected cycle varies by more than a predetermined range about 1.414 and when the corresponding overcurrent and overvoltage parameter is absent.

2. The improved distribution automation remote terminal unit of claim 1 further comprising means receptive of said error flag for extending said error flag indication from said improved distribution automation remote terminal unit.

3. The improved distribution automation remote terminal of claim 2 wherein said predetermined range about 1.414 is remotely delivered to said improved distribution automation remote terminal unit over said extending means.

4. An improved distribution automation remote terminal unit for connection to a plurality of potential sensors and to a plurality of current sensors, said plurality of potential sensors being connected to an AC distribution feeder for sensing the AC potentials in the three phase lines of said distribution feeder, said plurality of current sensors being connected to said distribution feeder for sensing the AC currents in said lines, said improved distribution automation remote termination unit comprising:

first means connected to each of said plurality of potential sensors for producing a plurality of times for each cycle a potential signal of reduced peak-to-peak voltage corresponding in phase to only the AC potential waveform on each phase of said lines of said distribution feeder.

second means connected to each of said plurality of current sensors for producing a plurality of times for each cycle a current signal of reduced peak-to-peak voltage corresponding in phase to only the AC current waveform on each phase of said lines of said distribution feeder, means receptive of said potential and current signals from said first and second producing means for determining the operation of said potential and current sensors and of said first and second producing means.

5. An improved distribution automation remote terminal unit for connection to a plurality of potential sensors and to a plurality of current sensors, said plurality of potential sensors being connected to an AC distribution feeder for sensing the AC potentials in the three phase lines of said distribution feeder, said plurality of current sensors being connected to said distribution feeder for sensing the AC currents in said lines, said improved distribution automation remote terminal unit being in communication with a remotely located master station, said improved distribution automation remote termination unit comprising:

first means directly connected to each of said plurality of potential sensors for producing a potential signal of reduced peak-to-peak voltage corresponding in phase to only the AC potential waveform on each phase of said lines of said distribution feeder, second means directly connected to each of said plurality of current sensors for producing a current signal of reduced peak-to-peak voltage corresponding in phase to only the AC current waveform on each phase of said lines of said distribution feeder, means receptive of said potential and current signals from said first and second producing means for sampling the voltage of said potential and current signals a plurality of times for each cycle to produce a digital value for each sampled voltage, means receptive of each said digital value from said converting means for processing waveform parameters of at least peak positive and negative signal values, zero crossing times, and RMS for each cycle for said plurality of sensed AC potentials and currents in said distribution feeder, said processing means further determining summary information on the signal states on said distribution feeder as sensed by said plurality of current and potential sensors, means receptive of said summary information for extending said information to said master station.

6. An improved distribution automation remote terminal unit (DA/RTU) for connection to a plurality of potential sensors (PT) and to a plurality of current sensors (CT), said plurality of potential sensors being connected to an AC distribution feeder (30) for sensing the AC potentials in the lines of said distribution feeder, said plurality of current sensors being connected to said distribution feeder for sensing the AC currents in said lines, said improved distribution automation remote termination unit comprising:

first means (T1, 320) directly connected to each of said plurality of potential sensors for producing a potential signal of reduced peak-to-peak voltage correspond in phase to only the AC potential waveform on each phase of said lines of said distribution feeder, second means (T2, 320) directly connected to each of said plurality of current sensors for producing a current signal of reduced peak-to-peak voltage corresponding in phase to only the AC current waveform on each phase of said lines of said distribution feeder.

means (330) receptive of said potential and current signals from said first and second producing means for sampling the voltage of said potential and current signals a plurality of times for each cycle, means (340, 342) receptive of said sampled voltage signals from said sampling means for converting each said sampled voltage to a digital value, means (360, 362) receptive of each said digital value from said converting means for processing waveform parameters of at least peak positive and negative signal values, zero crossing times, and RMS for each cycle for said plurality of sensed AC potentials and currents in said distribution feeder, means (380) connected to said determining means for storing said waveform parameters, and means (370, 372) connected to said storing means and receptive of said waveform parameters for determining selected information on the signal states on said distribution feeder.

7. The improved distribution automation remote termination unit of claim 6 further comprising:

means (80) receptive of said signal state information from said determining means for transmitting said selected information.

8. The improved distribution automation remote termination unit of claim 6 wherein said selected information further comprises backfeed information, said backfeed information being generated by said determining means when the zero crossing times for a given cycle indicates a reversal of current in said distribution feeder.

9. The improved distribution automation remote terminal unit of claim 6 wherein said selected information comprises overcurrent information, said overcurrent information being generated by said determining means when the RMS or peak current for a given cycle exceeds a predetermined value of current in said distribution feeder.

10. The improved distribution automation remote terminal unit of claim 6 wherein said selected state information comprises overvoltage information, said overvoltage information being generated by said determining means when the RMS or peak current for a given cycle exceeds a predetermined value of potential in said distribution feeder.

11. The improved distribution automation remote terminal unit of claim 6 wherein said determining means further determines information on the power states of said distribution feeder, said power states at least including phase angles, watts, VARS, and power factors.

12. An improved distribution automation remote terminal unit for connection to a plurality of potential sensors and to a plurality of current sensors, said plurality of potential sensors being connected to an AC distribution feeder for sensing the AC potentials in the lines of said distribution feeder, said plurality of current sensors being connected to said distribution feeder for sensing the AC currents in said lines, said improved distribution automation remote termination unit comprising:

first means plurality of potential sensors for producing a potential signal of reduced peak-to-peak voltage corresponding in phase to only the AC potential waveform on said distribution feeder, second means directly connected to each of said plurality of current sensors for producing a current signal of reduced peak-to-peak voltage corresponding in phase to only the AC current waveform on said distribution feeder, means receptive of said potential and current signals from said first and second producing means for sampling the voltage of said potential and current signals a predetermined number of times per cycle.

means receptive of said sampled voltage signals from said sampling means for converting each said sampled voltage to a digital value, means receptive of each said digital value from said converting means for processing waveform parameters of at least peak positive and negative signal values, zero crossing times, and RMS for each cycle for said plurality of sensed AC potentials and currents in said distribution feeder.

means connected to said determining means for storing said waveform parameters, and means connected to said storing means and receptive of said waveform parameters for determining selected information on the signal states on said distribution feeder, wherein said processing means further calculates the crest factor for each cycle, said storing means further stores said crest factor for each cycle, and said determining means generates error information in the event that the crest factor for a given cycle varies by more than a predetermined range about 1.414 and when the corresponding overcurrent and overvoltage parameter is absent, said error information being indicative of a failure in the operation of said potential and current sensors and of said first and second producing means.

13. The improved distribution automation remote terminal unit of claim 6 wherein said processing means further verifies that the period of said waveforms are within a preselected time range, when the aforesaid periods are within said preselected time range, said processing means averages the actual time of successive periods to continually update the sampling interval of said sampling means by dividing said averages by said plurality of sample times per cycle.

14. The improved distribution automation remote terminal unit of claim 13 wherein when thee aforesaid periods are not within said time range, said processing means selects the AC signal from a different one of current and potential sensors to provide a reference period for said sampling interval by dividing said reference period by said plurality of sample times per cycle.

15. The improved distribution automation remote terminal unit of claim 6 further comprising:

means (332) connected to said sampling means for generating analog positive reference voltage (+FS), a zero reference voltage, and a negative reference voltage (−FS), said sampling means delivering said reference voltages to said converting means analog positive, zero, and negative, said converting means converting said analog positive, zero, and negative reference voltages to digital positive, zero, and negative reference signals, said processing means adjusting each of said sampled voltage from said first and second producing means for zero offset according to said digital reference signal and by fully calibrating each said sampled voltage between said positive and negative digital reference signals.

16. The improved distribution automation terminal unit of claim 6 further comprising:

means (80) for transceiving information to and from said determining means, said information delivered to said determining means including settable time intervals for analyzing the states of signals on said distribution feeder, said determining means responsive to said settable time intervals for preprocessing said states of said signals and for delivering to said transceiving means summary indicators indicating selected conditions of said signal states according to said settable time intervals.

17. The improved distribution automation terminal unit of claim 6 further comprising:

said determining means having selected time intervals for analyzing the states of signals on said distribution feeder, said determining means responsive to said selected time intervals for preprocessing said states of said signals and for producing summary indicators indicating selected conditions of said signal states according to said selected time intervals.

18. The improved distribution automation terminal unit of claim 17 wherein the cold load pickup overcurrent signal state is determined by said determining means by waiting a first time interval after the detection of the zero current state transition to overcurrent to ascertain the existence of a normal current state on said distribution feeder.

19. The improved distribution automation terminal unit of claim 17 wherein the magnetization overcurrent signal state is determined by said determining means by waiting a second time interval after the detection of the zero current state transition to overcurrent to ascertain the existence of a normal current state o said distribution feeder.

20. The improved distribution automation terminal unit of claim 17 wherein the signal states caused by the operation of an upstream and downstream device on said distribution feeder are determined by said determining means.

21. An improved distribution automation remote terminal unit( DA/RTU) for connection to a plurality of potential transformers (PT) and to a plurality of current transformers (CT), said plurality of potential transformers being connected to an AC distribution feeder (30) for sensing the AC potentials in the lines of said distribution feeder, said plurality of current transformers being connected to said distribution feeder for sensing the AC currents in said lines, said improved distribution automation remote termination unit comprising:

first means (T1, 320) directly connected to each of said plurality of potential transformers for producing a potential signal of reduced peak-to-peak voltage corresponding in phase to only the AC potential waveform on said distribution feeder, second means (T2, 320) directly connected to each of said plurality of current transformers for producing a current signal of reduced peak-to-peak voltage corresponding in phase to only the AC current waveform on said distribution feeder, means (330) receptive of said potential and current signals from said first and second producing means for sampling the voltage of said potential and current signals a predetermined number of times per cycle, means (340, 342) receptive of said sampled voltage signals from said sampling means for converting each said sampled voltage to a digital value, means (360, 362) receptive of each said digital value from said converting means for processing waveform parameters of at lest peak positive and negative signal values, zero crossing times, and RMS for each cycle for said plurality of sensed AC potentials and currents in said distribution feeder, means (380) connected to said determining means for storing said calculated waveform parameters, means (370, 372) connected to said storing means and receptive of said calculated waveform parameters for determining information on the signal states of said distribution feeder, said signal states including at least said waveform parameters, backfeed information when the calculated phase angle indicates a reversal of current, overcurrent information when the calculated RMS or peak value for a given current cycle exceeds a predetermined current value, and overpotential information when the calculated RMS or peak value for a given AC potential exceeds a predetermined potential value.

22. The improved distribution automation remote terminal unit of claim 21 further comprising means (80) receptive of said signal state information from said determining means for transmitting said signal state information.

23. The improved distribution automation remote terminal of claim 22 wherein said transmitting means is further receptive of new predetermined current and potential values, said determining means receptive of said new predetermined current and potential values for replacing the old predetermined current and potential values.

24. The improved distribution automation remote terminal unit of claim 21 further comprising means (390, 394) receptive of said information from said determining means for issuing control outputs based upon said information.

25. The improved distribution automation remote terminal unit of claim 21 wherein said determining means further determines the operation of upstream and downstream devices on said distribution feeder by monitoring the operation of said devices as said devices affect said AC potentials and currents on said distribution feeder.

26. An improved distribution automation remote terminal unit (DA/RTU) for connection to a plurality of potential sensors and to a plurality of current sensors (CT), said plurality of potential sensors being connected to an AC distribution feeder (30) for sensing the AC potentials in the three phase lines of said distribution feeder, said plurality of current sensors being connected to said distribution feeder for sensing the AC currents in said lines, upstream and downstream devices being connected on said distribution feeder, said improved distribution automation remote termination unit comprising:

first means (T1, 320) directly connected to each of said plurality of potential sensors for producing a potential signal of reduced peak-to-peak voltage corresponding in phase to only the AC potential waveform on each phase of said lines of said distribution feeder, second means (T2 320) directly connected to each of said plurality of current sensors for producing a current signal of reduced peak-to-peak voltage corresponding in phase to only the AC current waveform on each phase of said lines of said distribution feeder, means (330) receptive of said potential and current signals from said first and second producing means for sampling the voltage of said potential and current signals a plurality of times for each cycle.

means (340, 342) receptive of said sampled voltage signals from said sampling means for converting each said sampled voltage to a digital value, means (360, 362, 380, 370, 372) receptive of each said digital value from said converting means for determining waveform parameters for each cycle for said plurality of sensed AC potentials and currents in said distribution feeder, said determining means receptive of said waveform parameters for further determining information on the signal states on said distribution feeder, said determining means having selected time intervals for analyzing the states of signals on said distribution feeder, said determining means responsive to said selected time intervals for preprocessing said states of said signals and for producing summary indicators indicating selected conditions of said signal states according to said selected time intervals, said signal states being caused by the operation of said upstream downstream devices on said distribution feeder.

27. An improved distribution automation/remote terminal unit (DA/RTU) for connection to a plurality of potential sensors and to a plurality of current sensors, said plurality of potential sensors being connected ot an AC distribution feeder (30) for sensing the AC potentials in the three phase lines of said distribution feeder, said plurality of current sensors being connected to said distribution feeder for sensing the AC currents in said lines, upstream and downstream devices located on said distribution feeder, said improved distribution automation remote termination unit comprising:

first means (T1, 320) directly connected to each of said plurality of potential sensors for producing a potential signal of reduced peak-to-peak voltage corresponding in phase to only the AC potential waveform on each phase of said lines of said distribution feeder, second means (T2, 320) directly connected to each of said plurality of current sensors for producing a current signal of reduced peak-to-peak voltage corresponding in phase to only the AC current waveform on each phase of said lines of said distribution feeder, means (330, 340, 342) receptive of said potential and current signals from said first and second producing means for sampling the voltage of said potential and current signals a plurality of times for each cycle to produce a digital value for each sampled voltage, means (360, 362, 380, 370, 372) receptive of each said digital value from said sampling means for determining waveform parameters for each cycle for said plurality of sensed AC potentials and currents in said distribution feeder, said determining means receptive of said waveform parameters for further determining information on the signal states on said distribution feeder, said determining means having selected time intervals for analyzing the states of signals on said distribution feeder, said determining means being further responsive to said selected time intervals for producing summary indications indicating selected conditions of said signal states according to said selected time intervals, said signal states caused by the operation of said upstream and downstream devices on said distribution feeder.

28. An improved distribution automation remote terminal unit (DA/RTU) for connection to a plurality of potential sensors and to a plurality of current sensors at a location near said sensors, said plurality of potential sensors being connected to an AC distribution feeder (30) for sensing the AC potentials in the three phase lines of said distribution feeder including neutral, a master station remotely located from said distribution automation remote terminal unit, said plurality of current sensors being connected to said distribution feeder for sensing the AC currents in said lines, said improved distribution automation remote termination unit comprising:

first means (T1, 320) directly connected to each of said plurality of potential sensors for producing a potential signal of reduced peak-to-peak voltage corresponding in phase to only the AC potential waveform on each phase of said lines of said distribution feeder, second (T2, 320) directly connected to each of said plurality of current sensors for producing a current signal of reduced peak-to-peak voltage corresponding in phase to only the AC current waveform on each phase of said lines of said distribution feeder, means (330, 340, 342) receptive of said potential and current signals from said first and second producing means for sampling the voltage of said potential and current signals a plurality of times for each cycle to produce a digital value for each sampled voltage, means (360, 362, 380, 370, 372) receptive of each said digital value from said sampling means for determining waveform parameters for each cycle for said plurality of sensed AC potentials and currents in said distribution feeder, said determining means receptive of said waveform parameters for further determining information on the signal states on said distribution feeder, said determining means having selected time intervals for analyzing the states of signals on said distribution feeder, said determining means being further responsive to said selected time intervals for producing summary indications indicating selected conditions of said signal states according to said selected time intervals, said signal states caused by at least one or a combination of the following occurring on said distribution feeder: magnetization, cold load pick-up, overcurrent, and backfeed, means (80) receptive of said summary indications for transmitting said summary indications to said master station.

29. An improved distribution automation/remote terminal unit (DA/RTU) for connection to a plurality of potential sensors and to a plurality of current sensors at a location near said sensors, said plurality of potential sensors being connected to an AC distribution feeder (30) for sensing the AC potentials in the three phase lines of said distribution feeder, a master station remotely located from said distribution automation remote terminal unit, upstream and downstream devices being connected to said distribution feeder, said plurality of current sensors being connected to said distribution feeder for sensing the AC currents in said lines, said improved distribution automation remote termination unit at said location comprising:

firt means (T1, 320) directly connected to each of said plurality of potential sensors for producing a potential signal of reduced peak-to-peak voltage corresponding in phase to only the AC potential waveform on each phase of said lines of said distribution feeder, second means (T2, 320) directly connected to each of said plurality of current sensors for producing a current signal of reduced peak-to-peak voltage corresponding in phase to only the AC current waveform on each phase of said lines of said distribution feeder, means (330, 340, 342) receptive of said potential and current signals from said first and second producing means for sampling the voltage of said potential and current signals a plurality of times for each cycle to produce a digital value for each sampled voltage, means (360, 362, 380, 370, 372) receptive of each said digital value from said sampling means for determining waveform parameters for each cycle for said plurality of sensed AC potentials and currents in said distribution feeder, said determining means receptive of said waveform parameters for further determining information on the signal states on said distribution feeder, said determining means receiving time intervals and values from said master station for analyzing the states of signals on said distribution feeder, said determining means being further responsive to said time intervals and values for producing summary indications indicating selected conditions of said signal states according to said time intervals and said values, said signal states caused by the operation of said upstream and downstream devices, magnetization, overcurrent, backfeed, faults occurring alone or together on said distribution feeder.

* * * * *